(12) United States Patent
Viel et al.

(10) Patent No.: US 8,263,488 B2
(45) Date of Patent: Sep. 11, 2012

(54) SURFACE-COATING METHOD

(75) Inventors: Pascal Viel, Meudon (FR); Sami Ameur, Sousse (TN); Christophe Bureau, Suresnes (FR)

(73) Assignee: Commissariat a l'Energie Atomique, Paris (FR)

( * ) Notice: Subject to any disclaimer, the term of this patent is extended or adjusted under 35 U.S.C. 154(b) by 1070 days.

(21) Appl. No.: 10/545,400

(22) PCT Filed: Feb. 13, 2004

(86) PCT No.: PCT/FR2004/050058
§ 371 (c)(1),
(2), (4) Date: Aug. 12, 2005

(87) PCT Pub. No.: WO2004/074537
PCT Pub. Date: Sep. 2, 2004

(65) Prior Publication Data
US 2006/0141156 A1   Jun. 29, 2006

(30) Foreign Application Priority Data

Feb. 17, 2003  (FR) ..................................... 03 01874

(51) Int. Cl.
| H01L 21/00 | (2006.01) |
| H01L 21/283 | (2006.01) |
| H01L 21/4763 | (2006.01) |
| B32B 15/00 | (2006.01) |
| C25D 11/00 | (2006.01) |

(52) U.S. Cl. ........ 438/628; 438/106; 438/455; 428/615; 205/158; 205/317; 205/413; 205/688; 205/334

(58) Field of Classification Search ............... 427/407.1; 205/158
See application file for complete search history.

(56) References Cited

U.S. PATENT DOCUMENTS

| 4,975,475 A | 12/1990 | Tsuchiya et al. |
| 5,350,323 A | 9/1994 | Boissel et al. |
| 5,578,188 A * | 11/1996 | Mertens et al. ............... 205/334 |
| 6,171,661 B1 | 1/2001 | Zheng et al. |

(Continued)

FOREIGN PATENT DOCUMENTS

EP    0250867 A1 *  7/1988

(Continued)

OTHER PUBLICATIONS

Calvert, P.; Mann, S., Review Synthetic and biological composites formed by in situ precipitation, 1988 Chapman and Hall Ltd., Journal of Materials Science 23, 3801-3815.*

(Continued)

*Primary Examiner* — Michael Cleveland
*Assistant Examiner* — Francisco Tschen
(74) *Attorney, Agent, or Firm* — Oblon, Spivak, McClelland, Maier & Neustadt, L.L.P.

(57) ABSTRACT

The invention relates to the deposition or attachment of materials to surfaces. It relates to a process for coating a surface with a first material and a second material, comprising the following steps:
  placing the first material on the said surface,
  inserting into the first material placed on the said surface precursor molecules of the second material,
  converting the said precursor molecules of the second material inserted into the first material into the said second material such that this second material becomes formed on the said surface to be coated and within the said first material placed on the said surface.
The object of the process of the invention is to allow the deposition of materials of any type onto surfaces of any type.

12 Claims, 12 Drawing Sheets

U.S. PATENT DOCUMENTS

| | | | |
|---|---|---|---|
| 6,375,821 B1 * | 4/2002 | Jerome et al. | 205/83 |
| 6,517,858 B1 | 2/2003 | Le Moel et al. | |
| 2002/0040805 A1 * | 4/2002 | Swager | 174/110 A |
| 2002/0168528 A1 | 11/2002 | Jonte et al. | |
| 2003/0149122 A1 * | 8/2003 | Bureau et al. | 521/25 |

FOREIGN PATENT DOCUMENTS

| | | |
|---|---|---|
| EP | 0250867 A1 * | 11/1988 |
| EP | 0 665 275 | 8/1995 |
| WO | 98/44172 | 10/1998 |
| WO | 00/24527 | 5/2000 |
| WO | WO02018050 * | 7/2002 |
| WO | 03/008660 | 1/2003 |
| WO | 03/018212 | 3/2003 |

OTHER PUBLICATIONS

Nishide, Hiroyuki; Deguchi, Jichio; Tsuchida, Eishun, Selective adsorption of metal ions on crosslinked poly(vinylpyridine) resin prepared with a metal ion as a template, 1976, Chemical Society of Japan, Chemistry Letters, 169-174.*

Viel et al. (Electropolymerized poly-4-vinylpyridine for removal of copper from wastewater), Applied Surface Science, 212-213, 2003, 792-796.*

Belanger et al. (Electrografting: a powerful method for surface modification), Chem Soc Rev, 2011, 40, 3995-4048).*

Plueddemann. "Adhesion Through Silane Coupling Agents", Fundamentals of Adhesion, pp. 279-290 1990.

Mekhalif et al. "Self-Assembled Monolayers of n-Dodecanethiol on Electrochemically Modified Polycrystalline Nickel Surfaces", Langmuir, vol. 13, pp. 2285-2290 1997.

Huc et al. "Self-Assembled Mono- and Multilayers on Gold from 1,4-Diisocyanobenzene and Ruthenium Phthalocyanine", J. Phys. Chem.B, vol. 103, pp. 10489-10495 1999.

Jerome et al. "Full-Electrochemical Preparation of Conducting/Insulating Binary Polymer Films", Chem. Mater., vol. 13, pp. 1656-1664 2001.

U.S. Appl. No. 10/544,651, filed Aug. 5, 2005, Bureau, et al.

* cited by examiner

SURFACE-COATING METHOD

TECHNICAL FIELD

The invention relates to the deposition or attachment of materials onto surfaces.

The invention relates in particular to a process for coating a surface, especially to a process for very adhesively depositing a material onto a surface.

The process of the invention has the objective of producing an adhesive deposit of materials of any type onto surfaces of any type.

PRIOR ART

Numerous techniques have been described to date regarding the coating of surfaces in general, and in particular regarding the attachment of materials onto electrically conductive or semiconductive surfaces. The adhesive deposition of polymers onto electrically conductive or semiconductive surfaces, the adhesive deposition of metals onto electrically conductive or semiconductive surfaces, and the adhesive deposition of ionic insulators onto electrically conductive or semiconductive surfaces will be considered hereinbelow, in this order, in order to demonstrate the numerous advantages of the present invention.

The operation via which a molecule of interest, for example a molecule having particular properties, is attached onto a surface such that it retains thereon all or some of its properties is known as functionalization. The functionalization of a surface assumes that the molecule of interest to be attached and a suitable process for attaching the said molecule onto the surface are available. Since the molecule of interest is usually an organic or organometallic molecule, the process generally used consists in calling upon the very large library of organic chemistry reactions by attempting to find functional groups, respectively on the surface and on the molecule of interest, which are compatible, i.e. which can readily—and if possible rapidly—react together.

For example, when a surface containing hydroxyl groups —OH or amine groups —NH is available, it may be functionalized by giving the molecule of interest isocyanate, siloxane, acid chloride, etc. groups, for example. When the molecule of interest does not include any functional groups that are directly compatible with those of the surface, this surface may be prefunctionalized with a bifunctional intermediate organic molecule, one of the functional groups of which is compatible with those of the surface, and the other with those of the molecule that it is desired to attach. The intermediate molecule is occasionally referred to as an adhesion primer, as described in document [1].

From this point of view, it is found that the functionalization of a surface is merely a particular case of organic chemistry reactions, in which one of the two reagents is a surface rather than a molecule in solution. Admittedly, the kinetics associated with heterogeneous reactions between a solution and a surface are substantially different from the analogous reaction in a homogeneous phase, but the reaction mechanisms are identical in principle.

In certain cases, the surface is activated by pretreating it so as to create thereon functional groups with higher reactivity, so as to obtain a faster reaction. These may especially be unstable functional groups, formed transiently, for instance radicals formed by vigorous oxidation of the surface, either chemically or via irradiation. In these techniques, either the surface or the molecule of interest is modified such that—once modified—the attachment between the two species amounts to a reaction known elsewhere in the library of organic chemistry reactions.

Unfortunately, these methods require relatively complex and expensive pretreatments, such as the use of vacuum installations for the plasma methods such as chemical vapour deposition (CVD), the technique of plasma-assisted chemical vapour deposition (PACVD), irradiation, etc., which, moreover, do not necessarily preserve the chemical integrity of the precursors.

Furthermore, it is observed that these methods are genuinely operational only insofar as the surface to be treated has an electronic structure similar to that of an insulator: in the language of physicists, it may be stated that the surface needs to have localized states. In the language of chemists, it may be stated that the surface needs to contain functional groups. On metals, for example, reactive deposition treatments (CVD, PACVD, plasma, etc.) allow better attachment of the deposit to the oxide layer or at the very least to a substantially insulating segregation layer.

However, when the surface is a conductor or an undoped semiconductor, such localized states do not exist: the electronic states of the surface are delocalized states. In other words, the notion of a "functional group" in the organic chemistry sense has no meaning, and it is thus impossible to use the library of organic chemistry reactions to attach an organic molecule of interest onto a surface.

Two notable exceptions exist: these are the spontaneous chemical reactions of thiols described especially in document [2], and of isonitriles described, for example, in document [3] on metal surfaces, and especially on gold surfaces.

However, these reactions cannot be exploited in all situations. Specifically, thiols, for example, give rise to weak sulphur/metal bonds. These bonds are broken, for example, when the metal subsequently undergoes cathodic or anodic polarization, to form thiolates and sulphonates, respectively, which desorb.

The means that is currently most commonly used for attaching organic molecules onto electrically conductive or semiconductive surfaces is to circumvent the difficulty by equating it to a known problem. It is a matter of forming on these surfaces, beforehand, hydroxyl groups —OH, by ensuring the promotion of a totally or partially hydrated oxide layer on the metal. On graphite, which has no solid oxide, anodization nevertheless produces hydroxyl groups, which may be exploited. When it has been possible to form hydroxyl groups on the surface, this equates to a surface that has localized surface electronic states, i.e. functional groups, and the situation equates to a known problem. In particular, it is then possible to apply all the functionalization processes that have been listed above for insulating surfaces.

However, besides the fact that it is impossible to form an oxide layer on gold or on many noble metals, the solidity of the interface manufactured between the organic molecule of interest and the metal surface depends on the oxide layer. Now, certain oxides, in particular when they are non-stoichiometric, are not covering or even are non-adhesive. Furthermore, this route requires at least two or three steps to result in the attachment of a molecule of interest, since the oxide layer must first be constructed before attaching the molecule itself (two steps), or alternatively before attaching an adhesion primer which will allow the attachment of the molecule of interest (three steps).

It is also possible to electrochemically attach organic fragments onto conductive and semiconductive surfaces. Thus, the process described, for example, in document [4] allows organic functional groups to be attached onto conductive surfaces. This is a process via which a conductive surface is placed under potential (cathodic) in a solution containing aryl diazonium salts, functionalized with the functional group that it is desired to attach onto the surface. Now, the aryl diazonium salts are manufactured from an aromatic amine, by means of a diazotization reaction using, for example, sodium nitrite in hydrochloric medium. This step requires a very low pH, and is therefore not compatible with all functional groups. It is known, for example, that it is impossible to diazotize an aromatic amine bearing a succinimide group, which is useful for attaching a molecule of interest bearing hydroxide or amine groups, or bearing an amine group. Furthermore, it is generally observed that the solutions prepared from aryl diazonium salts are unstable in the short term, especially due to the fact that these salts are heat- and photo-cleavable: this therefore limits their practical applicability.

However, when no functional group is compatible both with those of the molecule of interest and with the diazotization reaction, the use of the process of grafting diazonium salts thus necessitates the intervention of an intermediate step in which the electrografted layer is functionalized with a bifunctional adhesion primer, at least one of the groups of which is compatible with the functional groups of the molecule of interest.

Furthermore, this process does not make it possible, in practice, to produce thick layers, which leads to a relatively small number of grafted functional groups, which are very close to the surface. The functional groups that have been grafted are overall moderately accessible for subsequent functionalization reactions with an organic molecule. The most direct practical consequence of this comment is that the post-functionalization reactions on conductive surfaces covered with an organic layer according to this process are slow.

The electrografting of polymers, as described, for example, in document [5], allows the growth of polymer chains, especially vinyl chains, to be initiated by means of a polarized metal surface, which acts as initiator. In contrast with the preceding process, the electrografting of polymers allows the production of films of adjustable thickness. The experience acquired in the field shows that a range of between 2 nm and 1 μm is accessible to this type of process.

One of the particular features of the electrografting of polymers is that it leads to the formation of genuine carbon/metal covalent bonds between the polymer and the surface. This result, which is a direct consequence of the reaction mechanism shown in the attached FIG. 3, is a very advantageous route for the solid attachment of organic fragments onto electrically conductive and semiconductive surfaces.

However, since the process is based on the in situ synthesis of the polymer on the surface, major restrictions arise regarding the nature of the eligible precursor monomers, and thus of the types of polymers that may be deposited onto conductive or semiconductive surfaces via this process:

- It appears that only vinyl monomers and cyclic molecules that are cleavable by nucleophilic or electrophilic attack, for instance lactones, are compatible with these mechanisms, due to the fact that they are the only molecules that can polymerize via ionic chemical growth.
- Among the above monomers, only those containing electron-withdrawing or electron-donating groups are capable of activating the precursors sufficiently for the growth to be effective.
- Since the growth is relatively impeded by the proximity of the surface, it is generally observed that electrografting produces only relatively short polymer chains, which excludes the use of this process for attaching polymers of structures which, although eligible, are of high molecule weight.

As a result of these restrictions, electrografting unfortunately cannot therefore offer a systematic solution for the attachment of any type of polymer material onto a surface.

However, electrografting constitutes an advantageous means for solving the problem of the organic/conductor interface, which has led, for example, to them being used as a growth matrix for electrografted films/conductive polymer mixed films, so as to simultaneously exploit the high adhesion of the electrografted chains onto metal, and the anticorrosion properties of certain conductive polymers, for instance polypyrrole, which themselves show little adhesion to the substrates on which they have been synthesized, as described in document [6] of the attached list of references. The coatings formed by these authors are composite coatings, in which the conductive polymer is buried at the metal/organic interface to ensure its anticorrosion protection, and is, as it were, "encapsulated" by the electrografted polymer, as revealed by surface analysis in X-ray photoelectron spectroscopy (XPS).

Another example of a process is the electrodeposition of polymers, or cataphoresis, which is an electrochemical process for attracting, via essentially electrostatic interaction, a charged polymer (polyelectrolyte) present in a solution onto an electrically conductive or semiconductive surface, as described in document [7] of the attached list of references. This process makes it possible to obtain relatively adhesive coatings on electrically conductive or semiconductive surfaces, even though the absence of polymer/metal bonds leads to interfaces that are sensitive to working conditions. It is, however, restricted to charged polymers, and proceeds via an electro-controlled reaction, in which the thickness is closely dependent on the local electrical current. Relatively substantially non-uniform deposits of low thicknesses are thus generally observed, a levelling effect being observed only for thick layers typically of several microns or more.

In line with what has been recalled for the deposition of polymers, two major routes are mainly distinguished for the deposition of metals onto electrically conductive and semiconductive surfaces:

- The electrochemical route, or electrodeposition ("electroplating" or "electrochemical deposition" (ECD)), according to which the reduction of a solution containing salts of the metal that it is desired to deposit onto the surface of interest, used as the working electrode, is schematically performed. Electrolysis of this solution allows the deposition of the metal of interest onto the surface, provided that the reduction potential required is compatible with the chosen solvent and the chosen support electrolyte. However, it is generally observed that various additives such as surfactants, gloss agents, etc. are required to obtain a uniform deposit of good quality. In addition, even with these additives, this process constructs abrupt and thus weak interfaces, unless a high-temperature annealing operation is performed to bring about fusion at the interface. Furthermore, the electrodeposition of metals onto semiconductive surfaces, especially when they are finely worked and when a deposit that marries the fine work is required, remains impossible, especially because the electrodeposition reaction is an electro-controlled reaction, and is therefore highly sensitive to the ohmic drop topology. This problem arose in the Damascene process used in microelectronics for the production of interconnected copper networks described, for example, in document [8] of the attached list of references: copper lanes are deposited in increasingly narrow etches, which are at the present time of the order of approximately a hundred nanometers, carpeted with barrier layers consisting of semiconductive materials, for instance titanium nitride or tantalum nitride, the resistivity of which is a few hundred microohm-centimeters. Despite this moderate resistivity, the problems of uniformity of deposition can be solved only at the expense of introducing a very fine copper sublayer (seed layer) by CVD or PVD (physical vapour deposition) to improve the homogeneity of the copper deposit by electrodeposition.

Spraying processes, for instance CVD, PVD and related methods such as PACVD and ALCVD (atomic layer CVD). As indicated above, these methods are used to produce a seed layer for the deposition of copper by electrodeposition in the Damascene process. However, the interface constructed by CVD or by PVD between the copper of the seed layer and the semiconductor surface, known as the barrier layer, is abrupt. The very low affinity of copper for these barrier materials gives rise to adhesion problems at the copper/barrier interface, especially at very low thicknesses (<50 nm). These adhesion problems are sources of mechanical constraints at the time of annealing, of interface ruptures and thus of reduction in yield in the process. These problems constitute, at the present time still, a concern and a major challenge for the success of the Damascene process, in particular at very fine etchings of 0.1 μm and below, and require complementary means to reinforce the interface between the seed layer and the semiconductive barrier materials.

As regards the deposition of insulating solids, these are materials that are not polymers such as those described above. Specifically, ionic solids are considered in this case, for instance insoluble salts such as silver halides, hydroxyapatites, alkali metal or alkaline-earth metal carbonates, alkali metal or alkaline-earth metal tartrates, alkali metal or alkaline-earth metal citrates, alkali metal or alkaline-earth metal oxalates, etc.

By nature, these materials have an electronic structure that is very different from that of electrically conductive and semiconductive materials, so much so that it is difficult to envisage promoting bonds at the ionic insulator/conductor or ionic insulator/semiconductor interface. The interface between these precipitated salts and electrically conductive or semiconductive surfaces thus remains abrupt and at the very least uncontrolled.

It is known that it would be advantageous, for example, to produce the adhesive and reproducible deposit of coatings, for example of calcium hydroxyapatites on titanium surfaces of medical implants, and especially of hip prostheses or of dental implants, on the one hand to produce a barrier layer and prevent corrosion of the metal and the diffusion of metal ions—which are sources of inflammation—and on the other hand to offer, on the surface of the prosthesis, a terrain that is sufficiently biomimetic to promote the attachment and growth of bone cells (for example osteoblasts and osteoclasts) and the recolonization of the implanted article by the surrounding tissues. The need for high-quality attachment of the solid to the surface of the metal is known, in particular under working conditions when the prosthesis is itself subjected to mechanical stresses, as is the case in hip prostheses, for example.

Now, it is frequently observed that, under working conditions, the ceramic parts of a hip prosthesis crumble, locally releasing microparticles and nanoparticles that are sources of local inflammation, which may necessitate surgery for replacement.

As in the preceding situations, the following are performed at the present time:
 the deposition of calcium phosphate by plasma spraying onto metal implants, for example hip prosthesis tail;
 the formation of carbonate-containing apatite layers by immersion in a fluid simulating the properties of interstitial fluids ("Simulated Body Fluids").

These methods are essentially adopted for conventional surface treatment and are characterized by the precipitation of the solid on the surface, which has optionally been pretreated. For the reasons of differences in electronic structures recalled above, the reinforcement of the interfaces between these solids and a conductive or semiconductive surface remains problematic, and the abovementioned drawbacks are not solved.

There is thus a genuine need for new techniques for coating surfaces in general, which satisfy the many problems and drawbacks mentioned above of the techniques of the prior art.

DESCRIPTION OF THE INVENTION

The aim of the present invention is, specifically, to provide a process that satisfies, inter alia, all of the needs indicated above, which satisfies the criteria and requirements mentioned above, which does not have the drawbacks, limitations, faults and disadvantages of the prior art processes, and which overcomes the problems of the prior art processes associated, in particular, with the nature of the surface and the nature of the coating intended to coat the said surface.

The materials listed above, namely polymers and organic macromolecules, solids that can be electrodeposited and in particular metals, and finally solids that may be deposited by precipitation or by gravity have very different structures and behaviours. One object of the present invention is to propose a common process for securely fixing them to a surface to attach them thereto.

The process of the present invention is a process for coating a surface with a first material and a second material, comprising the following steps:
 placing the first material on the said surface,
 inserting into the first material a precursor of the second material, at the same time as or after the step consisting in placing the said first material onto the said surface,
 converting the said precursor of the second material inserted into the first material into the said second material such that this second material becomes formed on the said surface to be coated and within the said first material placed on the said surface.

The process of the invention is applicable to any type of surface, for example to surfaces such as those mentioned above in the prior art section.

According to the invention, the surface is, in general, a surface of a substrate onto which a coating is intended to be deposited, in order for the substrate concerned to be able to be used in the application for which it is intended, for example to protect it, to protect the environment in which it is used, to functionalize it, etc. It may be an insulating, conductive or semiconductive surface. It may be, for example, a mineral surface, for example a metallic or ceramic surface; an organic surface, for example a polymer surface. These surfaces will also be known as "surface to be coated" in the present text. Many examples of applications are given below and others still will become apparent to those skilled in the art.

The process of the present invention can especially produce a very adhesive deposit of a material, referred to hereinbelow as the "material of interest", which may be the first material or the second material within the meaning of the present invention, onto a surface, whereas, by using a prior art process, the said material of interest does not adhere or adheres very little to the said surface. More particularly, it can produce an adhesive deposit of a material of interest on a surface by combining this deposit with that of another material, also known as the complementary material. For the purposes of the present invention, if the material of interest is the first material, the complementary material is then the second material, and vice versa.

Specifically, the materials that may be deposited very adhesively onto surfaces, especially onto conductive or semiconductive surfaces, according to the present invention, may be divided into two categories, depending on the order of deposition on the surface.

The category of the first material for the purposes of the present invention, referred to hereinbelow as the "layerable material" or "armouring material" depending on the use made of the present invention. It may be, for example, any polymer or any organic macromolecule known to those skilled in the art allowing the present invention to be implemented. It is advantageously a matter of organic materials that may be deposited by any process for obtaining a deposit, preferably in the form of a film, of the said material on the surface to be coated. According to the invention, the first material is a material that may advantageously be placed on the surface via a technique chosen from centrifugation ("spin-coating" or "spin-on"), spraying, dipping ("dip-coating"), electropolymerization, electrografting etc. Mention may be made, for example, of pyrrole, aniline, thiophene, ethylene dioxythiophene (EDOT), ethylenediamine, phenol, etc. polymers, and also derivatives thereof. These polymers are suitable, for example, for electropolymerization. Examples that may also be mentioned include the polymers obtained from activated, cyclic vinyl monomers that may be cleaved via nucleophilic or electrophilic attack. These polymers are suitable, for example, for electrografting. Further examples are given below.

The category of the second material for the purposes of the present invention, also referred to hereinbelow as "reinforcer" when it reinforces the attachment of the first material according to the present invention. This is advantageously a mineral material, which can become aggregated on the surface, i.e. the mode of deposition of which on the surface is: either a precipitation, i.e. via deposition by natural or artificial gravity; or a crystallization, for example crystal growth; or a deposit in amorphous form; or an electrodeposit, in amorphous or crystalline form; or a deposit in the form of aggregates or aggregation. Preferably, the second material is a material that can be electrodeposited.

According to the present invention, the "reinforcing" material may be identical to or different from the material constituting the surface that is intended to be coated.

As emerges clearly on reading the present description, the term "reinforcing" does not anticipate the role of the second material in the present invention: specifically, the "reinforcing" material that corresponds to the second material can either reinforce the adhesion of the first material to the surface, or can itself be reinforced, or alternatively its adhesion with the surface, via the first material in the case where the first material serves as armouring for the purposes of the present invention.

In the category of the second material, among the materials that may be used in the present invention, the following may be distinguished:

materials that may be electrodeposited: these are mineral or organic materials, which may be electrochemically deposited, and whose deposits on an electrically conductive or semiconductive surface preferably result from electro-controlled reactions, i.e. electrochemical reactions in which the amount of material deposited is linked, and usually proportional, to the charge (=integral of the current) passed through the electrochemical deposition cell. Specifically, these electro-controlled reactions allow control of the deposition and/or of the formation of the second material from its precursor. Thus, the precursor of the second material will advantageously be an ion of this material. These may especially be reactions for depositing a metal from a solution of precursor ions of this metal, for example the deposition of copper from a solution containing cupric ions, and similarly the deposition of zinc, gold, tin, titanium, vanadium, chromium, iron, cobalt, lithium, sodium, aluminium, magnesium, potassium, rubidium, caesium, strontium, yttrium, niobium, molybdenum, ruthenium, rhodium, palladium, silver, cadmium, indium, lutetium, hafnium, tantalum, tungsten, rhenium, osmium, iridium, platinum, mercury, thallium, lead, bismuth, lanthanides and actinides from the respective ions thereof; the deposition of insulating polymers by electropolymerization of precursor monomers, for instance ethylenediamine or phenols; to the deposition of conductive polymers by electropolymerization of precursor monomers, for instance pyrrole, aniline, thiophene, methylthiophene, ethylenedioxythiophene (EDOT) and derivatives thereof; the deposition of polyelectrolytes by electrodeposition from solutions containing them; and materials that cannot be electrodeposited: these are materials that may be deposited on the surface by precipitation, crystallization, crosslinking, aggregation, etc. The precipitation may be produced under the effect of natural or artificial gravity, in the form of aggregates, globules or lumps. They may especially be precipitation or crystallization reactions of ionic salts, for instance hydroxyapatites, calcium and/or magnesium hydrogen phosphates, silver halides, etc. and more generally of all insoluble salts, especially water-insoluble salts; crosslinking reactions of amino oligomers or polymers by bifunctional compounds, for instance epichlorohydrin, glutaric anhydride, glutaraldehyde or bis-epoxy compounds; crosslinking reactions of hydroxylated oligomers or polymers by bifunctional compounds, for instance glutaric anhydride or dicarboxylic acids, for instance azelaic acid; crosslinking reactions of vinyl polymers by polyvinyl crosslinking agents, for instance divinylbenzene or pentaerythrityl tetramethacrylate. Further examples are given below.

The expression "precursor of the second material" in the present invention obviously includes a single precursor of the second material or a mixture of at least two precursors chosen from the precursors of the second material mentioned in the present text. Thus, for example, the precursor of the second material may be inserted into the first material by means of a solution or bath of a mixture of precursors such as those mentioned above, for example of precursor salts.

When at least two precursors are used in the implementation of the present invention, the conversion of the precursor into a second material within the first material may be performed so as to convert the various precursors simultaneously or successively independently of each other, for example by applying suitable precipitation, electrodeposition, etc. conditions. These particular embodiments of the present invention may be used, for example, for the manufacture of catalysts.

According to the present invention, the material of interest to be deposited on the surface may belong to one or other of the two abovementioned categories. In other words, as mentioned above, the material of interest may be the first material or the second material for the purposes of the present invention:

For example, if the first material is the material of interest and if it is a layerable material, its adhesive deposition onto the surface is performed or improved by means of depositing the second material. Once the process is complete, it may be said that the material of interest, i.e., in this case the first material, has been layered with the second material on the surface.

For example also, if the second material is the material of interest, and if its adhesive deposition onto the surface is performed or improved by means of the first material chosen from the layerable materials mentioned above, once the process is complete, it may be said that the second material has been reinforced with the first material on the surface.

Depending on whether the material of interest is the first or the second material according to the invention, the principle for implementing the process of the present invention will thus usually be identical, give or take a few quantitative details, to the extent that these expressions are relative only to the interest shown in such a material rather than to that which allows its deposition to be assisted, and thus to the intended application, but not to the process: a one-to-one relationship thus exists between the abovementioned lists of materials. It is for this reason that they have been called "first" and "second" materials in the definition of the process of the invention.

One particularly important aspect of the invention is that very good adhesion of a material of interest chosen from one of these two categories is achieved by combining its deposition with that of a complementary material chosen from the other category.

Thus, according to a first embodiment of the process of the present invention, the first material may be attached to the surface, for example by chemisorption or electrografting, in the form of an armouring material to serve as an attachment or to reinforce the attachment of the second material to the surface by means of the interface connection created between this armouring material and the surface: it is stated, according to the invention, that the deposit of the second material on the surface is reinforced with the first material. This embodiment is illustrated schematically in the attached FIG. 1. This embodiment may be performed, for example, in the following manner: the first material is a polymer, for example an organic polymer, for example electrografted onto the surface. The second material is a metal deposited within the polymer, for example in the form of a layer. The polymer thus serves as "armouring" for attaching to the metal layer. According to this embodiment, the first material may be buried in the second material.

According to a second embodiment of the process of the present invention, the first material may be attached to the surface, for example by chemisorption or electrografting, or simply deposited in a non-adhesive manner, onto the surface in the form of a layering material, and the second material formed within it reinforces the attachment of the first material to the surface by means of the interface connection created between this second material and the surface: it is stated, according to the invention, that the attachment or deposit of the first material on the surface is reinforced with the second material. This embodiment ensures for the first material a more solid interface than that existing between it when it is alone and the surface. This embodiment may be illustrated in the same manner as previously, but since the material of interest is the first material, care will be taken to ensure that it is not buried by the second material during the formation of this second material from its precursor. For example, since the second material, in this case the reinforcing material, is deposited, for example, by an electro-controlled reaction, the electrical charge may advantageously be controlled during its electrodeposition such that its growth within the first material, or layerable material, takes place only within it and does not bury the said material. Via this embodiment of the invention, the roots of the first material, which in this case is a polymer, are, as it were, "dipped" in the second material, which may preferably be chosen for its interface compatibility with the surface. This example is illustrated schematically in the attached FIG. 2.

It is this second embodiment of the process of the present invention which suggested to the present inventors the name "electrochemical layering", layering being a process used in botany to recreate roots from branches by inserting them into the ground so that they project from the soil.

According to one mode that is particularly preferred by the present inventors, the process of the invention may be performed on a surface that is a conductive or semiconductive surface, the first material is a vinyl polymer, the second material is a metal and the precursor of this metal is an ion of this metal.

The step of inserting the precursor of the second material into the first material according to the process of the invention is a determining step. Specifically, it is during this step that the precursor of the first material is inserted into the second material in order to be able thereafter to be converted therein into the second material. Numerous techniques falling within the context of the present invention for this second step may be used. They range from simple placing of the precursor of the second material in contact with the first material placed on the surface, for example by dipping the first material placed on the surface into a suitable solution of the said precursor, to more elaborate techniques such as the use of an electrolytic bath.

If the first material does not allow easy insertion of the precursor of the second material therein, or if this insertion must be promoted, or even forced, according to the invention, an insertion solution that is both a solvent for or transporter of the precursor of the second material, and a solvent and/or solution that swells the first material may advantageously be used, the said insertion solution comprising the precursor of the second material.

For example, a solvent for the first material when it is a polymer, is a solvent for this polymer.

The expression "solution which swells the first material" means a solution that becomes inserted into the first material and that deploys its structure to allow the insertion into the first material of the precursor of the second material that it contains. For example, it may be an aqueous solution, for example which hydrates the first material. Vinyl polymers that are swollen by water, especially poly(4-vinylpyridine), P4VP, which is insoluble in water, or polyhydroxyethyl methacrylate, PHEMA, which is soluble in water and thus also swollen by this solvent, are known. These polymers may be used as first material according to the present invention.

This insertion solution is also a solution which makes it possible to convey the precursor of the second material within the first material. It will therefore be a solution that allows a sufficient solubilization or dispersion of the precursor for the implementation of the present invention. Specifically, in the case of insoluble salts of the second material, this solution will preferably need to be able to disperse the precursor of the second material sufficiently to be able to insert it into the first material.

The insertion solution will thus be chosen as a function of numerous criteria. Among these, mention may be made of: as a function of the surface: for example to avoid chemical interactions such as oxidation of the surface during the implementation of the process; as a function of the first material: so that this solution does not remove this first material from the surface onto which it has been deposited; as a function of the precursor of the second material: it must allow its dissolution, but also its conversion into second material; as a function of the second material: it must allow its formation within the first material, and especially the implementation of its deposition process, for example the electrodeposition of the second material.

For example, since the prior art contains a wealth of information firstly regarding the production of metallic films by electrodeposition from aqueous solutions, and secondly regarding their solubility properties in water, the appropriate insertion solution that is preferred according to the invention is an aqueous solution, especially when the first material is a polymer that can be swollen with water, for example in the form of an electrografted armouring film. Other insertion solutions and processes for inserting the precursor of the second material into the first material are described below. A person skilled in the art will be able to select yet other suitable insertion solvents for implementing the present invention, for example with the precursors of the category of the abovementioned "reinforcing" materials.

According to a third embodiment of the process of the present invention, the step consisting in inserting the precursor of the second material into the first material placed on the said surface may be performed at the same time as the step consisting in placing the first material onto the said surface, by means of a solution comprising both the said first material or a precursor of the said first material, and the precursor of the second material. This embodiment is particularly advantageous, for example, when it is difficult to find an insertion solution for swelling the first material placed on the substrate. Thus, during the first step consisting in placing the first material onto the substrate, the precursor of the second material is taken into the first material, and, when the first material is placed on the surface, to apply the step of the process of the invention consisting in converting the precursor of the second material into the said second material within the said first material.

The conversion step of the present invention is also important, since it must allow the precursor of the second material to be converted into the said second material on the surface to be coated and within the first material. The modes of this conversion have been described above and are described in further detail below. Preferably, the precursor of the second material may be converted into the said corresponding second material via a technique chosen from electrodeposition and precipitation.

The process of the present invention may thus comprise, once the surface that is intended to be coated and the material of interest are determined, the selection of a suitable complementary material, and also the selection of the processes for depositing each of these two materials according to the process of the present invention, which will allow very strong adhesion of the said material of interest to the said surface to be produced.

In a first example of application of the invention, in accordance with the first abovementioned embodiment, in which it is desired to adhesively deposit a material of interest, which is, for example, a metallic material (A) classified above in the category of the second material, onto the surface of a substrate, for example of a semiconductor (B), the process of the invention may comprise the following steps:

selection of an armouring material, or first material within the meaning of the present invention, for example a polymer;

selection of a process for depositing the armouring material onto the surface, for example the semiconductor (B); in this example, it is this deposition process that will largely determine the solidity of the connection between the material of interest, metal (A), and the surface, in this case the semiconductor (B). According to the invention, a person skilled in the art may, of course, select this process as a function of this solidity criterion, but also on the basis of other considerations, based especially on the thickness of the desired layerable material, for example in the form of a film, on the desired uniformity of thickness of this material, on the cost etc. Very solid fixing of the armouring material to the surface, for example of the semiconductor B, may be obtained, for example, if the armouring material is a polymer that can be electrografted onto the surface, for example the semiconductor B, since this process makes it possible to produce covalent chemical bonds between a polymer and a conductor or a semiconductor;

selection of a process for depositing the second material within the meaning of the present invention, in this case the metal A, such that it is compatible with the process for depositing the first material, the armouring material. The term "compatibility" means that this process preferably allows the growth of the reinforcing material within the armouring material: this assumes especially that the precursors of the second material can first of all become inserted, i.e. diffused, within, i.e. inside, the armouring material, or first material, and that the process can be applied thereto to allow the formation of the second material within the armouring material;

implementation of the process of the invention as defined above: if the second material is a metal, metallic ions of this metal (A) will be used as precursors of the second material, advantageously dissolved in a solvent and/or a swelling agent for the armouring material, for example the polymer, to form the solution of the precursor of the second material; this solution allows the diffusion of the ions of the precursor within the polymer, after which, for example, a process of the galvanic type is applied, for example electrodeposition (electroplating or electrochemical deposition (ECD)), to form the metal (A) within the polymer. Since this process is electro-controlled, control of the charge advantageously makes it possible to monitor that the growth of the metal (A) takes place over the entire thickness of the first material, in this example of the polymer forming the armouring material, before taking place over its surface.

In this way, the layerable material, i.e. the polymer, or first material, is finally buried in the metal (A), to which it served as "armouring" for attachment to the metallic surface (B), by means of the interface connection created between the armouring material and the semiconductor (B): the deposit of the first material, in this case the metal (A), on the surface, in this case the semiconductor, is the said to have been reinforced by the first material, in this case the polymer. This application example is illustrated in the attached FIG. 1.

It is demonstrated, for example, in the "examples" below that the adhesion of a layer of copper electrodeposited onto a gold surface, or the adhesion of a film of silver chloride onto a metallic surface is thus, surprisingly, reinforced by a pretreatment that provides a buried polymer reinforcement of the interface between the two metals or between the metal and the silver chloride.

In a second application example of the present invention, in accordance with the abovementioned second embodiment, in which it is desired to deposit a polymer (P), as a layerable material of interest, onto a surface, for example of a conductive substrate, for example made of metal, the principle of the process is based on the same steps as those described above, except for the final implementation step. Specifically, it is preferable in this final step, as stated above, to control the growth of the second material within the first material such that it does not bury this second material.

It is demonstrated, for example, in the "examples" section below that, by means of this second embodiment of the invention, it is possible, unexpectedly, to attach a film of poly(4-vinylpyridine) (P4VP) deposited by centrifugation onto a gold surface, such that it withstands drastic rinsing with one of its solvents, whereas the film of P4VP alone, on the same surface, is removed by the same rinsing in the absence of the treatment according to the invention.

According to the invention, when the objective is that the material of interest is the only one of the first and second materials present at the surface when the implementation of the process of the invention is complete, the process will be adapted, as described in the present text, either such that the first material emerges from the second material, or such that the second material immerses or covers the first material.

Advantageously, according to the invention, the material of interest emerges or covers, depending on the chosen embodiment of the invention, for example by a thickness at least equal to 20% of the total thickness formed by the two materials on the surface by means of the process of the invention, following the armouring or layering. The thickness of this emerging portion is, obviously, adapted as a function of the use for which this surface is intended.

The thickness of the coating formed by the first material and the second material on the surface by implementing the process of the invention is generally between 1 nm and 100 μm. It obviously depends on the nature of the materials used and on the desired type of coating.

The coating obtained by means of the process of the present invention thus comprises the first material and the second material intermingled, with or without chemical bonds or interactions between them, depending on the chemical nature of the materials used.

The process of the present invention thus has numerous applications that a person skilled in the art can discover for himself on reading the present description.

Among these applications, non-limiting examples that may be mentioned include the following:

It allows interface reinforcement between a conductive or semiconductive substrate and a metal, for example by means of a polymer armouring pregrafted onto the substrate in the manner illustrated in the attached FIG. 1. This application is advantageous for the mechanical reinforcement of copper/antidiffusion layer interfaces such as TiN, TaN, TiNSi, etc., especially in the copper interconnection in microelectronics, in particular according to the Damascene or Dual Damascene processes.

It more generally offers an advantageous alternative to adhesive sublayers in metal/metal, metal/conductive polymer, conductive polymer/semiconductor or metal/semiconductor interfaces.

For example, it also allows the deposition of very adhesive organic layers onto conductive or semiconductive substrates, especially for automotive anticorrosion, optics, fashion articles, mechanical lubrication, the deposition of hot-melt polymer layers for "flip-chip" polymer applications, or alternatively for functionalizing the sensitive part of a sensor. It thus also relates to the use of the process of the invention in an anticorrosion treatment of a metallic surface.

For example, it also allows the deposition of very adhesive organic layers such as the deposition of biocompatible polymers and/or reservoirs for the encapsulation and release of active molecules onto conductive implantable objects, for instance imprints for holding grafts in plastic surgery, or vascular implants (stents), cochlear implant electrodes, catheter guides (guidewires), orthopaedic implants and especially hip prostheses, and dental implants. It thus also relates to the use of the process of the invention for the surface treatment of an object that can be implanted into a body.

For example, it also allows the deposition of very adhesive organic layers, such as the deposition of biological macromolecules, or of macromolecules bearing or encapsulating biological molecules, for instance peptides, proteins, polysaccharides, oligonucleotides or DNA or RNA fragments, especially for the manufacture of DNA or protein biochips. It thus also relates to the use of the process of the invention for the manufacture of biochips.

The process of the present invention also allows the manufacture of catalysts, for example by using as precursor of the second material the abovementioned metallic precursors or a mixture thereof, for example a rhodium, platinum, palladium, cobalt, copper, etc. precursor or a mixture thereof. In this application, the first material may be one of those mentioned in the present text, advantageously a polymer comprising functions that can serve as ligands for complexing the precursors of the second material, for instance poly(4-vinylpyridine) (P4VP), and also any polymer bearing cysteine groups, which may be used to bring about the attachment, to a surface, of a salt of the catalyst, for example palladium salts. After reduction within the film of the first material, and possibly calcination of the organic residue, the catalyst is obtained in its metallic form, for example palladium metal, either in film form or in the form of metallic aggregates. The catalysts thus obtained have the advantage, specifically, of initiating the deposition, for an electroless process, of layers of different materials, and especially of copper in applications related to microelectronics (cf. for example: S. James, H. Cho et al., "Electroless Cu for VLSI", *MRS Bulletin,* 20 (1993) 31-38).

DETAILED DESCRIPTION OF THE INVENTION

The idea underlying the establishment of the above classifications is that processes are known for:
constructing very solid interfaces between organic materials, especially macromolecular materials, and in particular polymers, and electrically conductive and semiconductive surfaces, but the list of organic materials concerned is limited;
producing adhesive deposits of metals on other metals, but again the list of entirely compatible metal/surface couples is limited.

As indicated above, it is in fact known how to form very solid chemical bonds between polymers and electrically conductive or semiconductive surfaces via electrografting of vinyl monomers or of cyclic molecules that can be cleaved via nucleophilic or electrophilic attack, for instance lactones and epoxy compounds. It is also known how to perform the covalent electrografting of functionalized aromatic nuclei, starting with diazonium salts or sulphonium salts.

In a complementary manner, it is known how to produce adhesive deposits of copper onto copper or onto most of the transition metals via electrodeposition, for example.

According to the invention, these deposition methods are astutely used, in a crossed manner, to assist, respectively, for example, the deposition of polymer materials that cannot be electrografted onto certain surfaces and also, for example, that of metals which show poor adhesion to certain surfaces, for example to conductive or semiconductive substrates of interest.

In addition, the present invention uses one of these methods to assist the adhesion of materials that do not conventionally form adhesive deposits on certain surfaces, for example on conductors or semiconductors, i.e. ionic solids.

It may be considered that the coating formed on the surface by implementing the process of the invention is a composite coating, since it has all the characteristics thereof. Specifically, it generally comprises a first material, which is preferably organic, and a second material, which is preferably mineral.

Thus, according to the invention, when the object is to reinforce an interface between two materials, for example a metal and a semiconductive substrate, as represented in the attached FIG. 1, an armouring material thus constituting the first material within the meaning of the present invention is, for example, deposited by electrografting onto the said surface, for example the surface of the semiconductive substrate, and the other material, for example the metal, constituting the second material within the meaning of the present invention, is formed from its precursor within the armouring material. The formation of the second material, for example when it is a metal, is advantageously obtained either by electrodeposition or by chemical precipitation of the precursor of this second material. In this example, when the operation is complete, the armouring material is buried.

According to the invention, when the object is to layer an organic material, constituting the first material within the meaning of the present invention, onto a surface, for example of a conductive or semiconductive substrate, the reinforcing material, constituting the second material within the meaning of the present invention, is constructed within the said organic material advantageously by electrodeposition, for example by electrolysis, the said organic material having been deposited onto the substrate by any suitable means, for example by centrifugation, dipping or spraying.

The notion of adhesion of a coating to a surface is a relatively subjective notion, since its assessment depends on the stress to which the coating is subsequently subjected under the working conditions. Thus, for example, electrografting is a process known to form polymer films on conductors or semiconductors that withstand ultrasonic rinsing.

Any polymer deposited according to the present invention onto a surface by simple centrifugation and then reinforced with a second material within the meaning of the present invention, for example a metal, as shown in the attached FIGS. 1 and 4, forms a reinforced coating whose adhesion to the surface is improved compared with a deposit of the polymer alone, without reinforcement on the said surface, without anticipating the nature of the interface that has been constructed between the reinforcing material and the surface.

In many cases, this "resistance to removal" of the polymer from the surface of the substrate may prove to be sufficient, to the extent that the above list of processes may be completed by considering that, for an interface reinforcement as shown in the attached FIG. 1:

the armouring polymer or macromolecular materials, constituting the first material, may be deposited by electrografting, centrifugation, dipping or spraying;

the reinforcing materials, constituting the second material, may be deposited by electrodeposition or chemical precipitation.

It is for this reason that armouring materials and layerable materials are placed in the same category according to the initial classification: for example, a polymeric or macromolecular organic material may be said to be an "armouring" material if it is completely buried after deposition of the reinforcing material, and "layered" if it is not completely buried. In the first case, the user will have chosen to bury it because the reinforcing material is the material of interest; in the second case, the user will have chosen not to bury it in order to exploit its properties once the reinforcement has been established.

Thus, for example, for the application of the present invention to the adhesion of copper lanes onto TiN in the Damascene process in microelectronics, the material of interest is copper, whose interface with TiN it is desired to improve for mechanical reasons: a film of P4VP may be deposited onto TiN by electrografting or centrifugation, before burying it in a layer of electrodeposited copper as shown in FIG. 1. Conversely, high molecular weight P4VP may be deposited onto a stainless-steel or graphite surface of high surface area to manufacture a complexation filter that may be used in a device for treating liquid effluents, and to do this the surface is impregnated with P4VP and this surface is then dipped into a solution containing metal ions in order for them to become inserted into the polymer film, and finally the copper thus trapped is reduced such that the complexing pyridine groups are still accessible above the reinforcing metal.

Moreover, if a first material placed on a surface via a suitable process shows strong adhesion to the surface, and if, independently of this first material, the second material itself also shows strong adhesion to this surface, the process of the present invention advantageously makes it possible, as it were, to cumulate the adhesions of these two materials on the said surface. The present invention thus provides ultra-resistant coatings, which have numerous applications.

It is obvious that the burying of one or other of the materials is not a necessity. The process of the invention will, of course, be adapted according to the use for which the coating is intended.

Irrespective of the considered application of the present invention, in particular the selected deposition processes, it is observed that the step of depositing the armouring materials or materials to be layered, which constitute the first material for the purposes of the present invention, is always performed before that of the reinforcing materials, which constitute the second material for the purposes of the present invention, as is shown in the attached FIGS. 1, 2 and 4.

Once the first material, for example a polymeric or macromolecular organic material, is placed on a surface of a substrate, for example a conductive or semiconductive substrate, it is thus necessary for the precursors of the second material, for example the reinforcing material, to be able to be inserted, for example by electrodeposition or precipitation, into the first material.

This insertion may take place by simple contact of the precursor of the second material, preferably by means of a solution thereof, with the first material placed on the surface.

Thus, according to the invention, the solvent for the insertion step is advantageously selected such that it allows both the dissolution of the precursor of the second material and, if necessary, the swelling and/or dissolution of the first material, for example the organic armouring film or film to be layered, so as to optimize the insertion of the precursor.

For example, in the case where the first material is a polymer, the solution containing the precursor of the second material may advantageously be selected from liquids that swell but are not solvents for the polymer or solvents for the polymer. In particular, if the first material is a polymer that has been electrografted, it is possible to select swelling liquids that are not solvents for the polymer, but also solvents for the polymer since this polymer cannot be detached from the surface with these solvents, and thus by the solution of the precursor that these solvents form.

On the other hand, if the first material, for example an organic material, has been deposited by centrifugation or dipping to form armouring or layering, a solution consisting of a simple swelling solvent for the polymer, which has as little solvent nature as possible, will preferably be used so as to avoid washing the polymer off the surface onto which it has been predeposited.

For example, in the case where the first material is P4VP, this polymer may be readily electrografted or deposited, by centrifugation or dipping, from a solution in dimethylformamide (DMF), which is a good solvent for the polymer. Once the solvent has been evaporated off, it is possible, in either case, to dip the surface on which this first material has been placed in an aqueous solution, since water is a good swelling agent but a poor solvent for P4VP.

Under these conditions, according to the invention, the insertion of the precursor of the second material, for example ions, may take place "naturally", by simple diffusion into the polymer, for example by dipping into a solution containing the precursor ions of the second material. This diffusion is generally proportionately faster the more concentrated the precursor bath.

The inventors have thus observed that a film of P4VP on stainless steel approximately a hundred nanometers thick is saturated with copper ions within a few minutes at room temperature when the surface is dipped into a solution containing 20 g/l of copper sulphate.

Advantageously, the saturation of the first material, for example in the form of a film, with the precursor of the second material may also be facilitated by the presence within the first material of functional groups capable of retaining the precursor of the second material, for example by complexing it when it is in the form of precursor ions. This retention may be provided by means of ionic bonds, dative bonds or interactions of Lewis acid-Lewis base type, covalent bonds or hydrogen bonds, or alternatively by mechanical retention (absence of possibility of diffusion out of the first material), for instance when the precursor of the second material is precipitated within the first material.

For example, in the abovementioned example, the cupric ions, forming the precursor of the second material which is copper, are very efficiently complexed by the lone pairs of the pyridine nitrogens of the P4VP forming the first material.

Advantageously, the first material for example a polymer, may thus be chosen as a function of the precursor of the second material, especially when this second material is in the form of ions, such that this first material contains groups that complex the precursor satisfactorily in order for it to remain inserted within the polymer.

Once the precursor of the second material is inserted in the first material, for example in the polymer film, it is advantageously possible to perform either its electroreduction or its precipitation, within the film so as to form the said second material within the said first material.

For example, if the object is to produce armouring of the second material using the first material, for example in the case of interface reinforcement in the Damascene process, electroreduction of the precursor of the second material, for example of copper, may advantageously be performed in the same bath as that used to saturate the film with the said precursor, since the object in this example is that the growth of the reinforcing material continues beyond the thickness of the armouring material. FIGS. 1 and 4 schematically illustrate this example.

For example, if the object is, on the contrary, to layer an organic film forming the first material, the surface bearing the organic film swollen with precursor ions may be advantageously removed from the precursor solution and then dipped in an electrolytic bath not containing the precursor ions.

In this latter example, according to the present invention, the presence of functional groups that complex the ions in the film will advantageously slow down the exit of the ions from the film into the new solution since the inversion of the concentration gradients between the precursor inserted into the first material and the precursor solution, and between the precursor inserted into the first material and the solution formed by the electrolytic bath without precursor results in inversion of the precursor diffusion currents. The inventors have observed, specifically, by infrared reflection spectroscopy (IRRAS) that a P4VP film 100 nm thick on stainless steel, saturated with cupric ions, conserves its ions even after a residence of several hours in a saturated aqueous sodium chloride solution.

If the second material is formed from its precursor by electrodeposition, the amount of the second material deposited into the first material, for example of a film to be layered, may advantageously be controlled by controlling the electrodeposition potential. In addition, the fact that the second material is prepared exclusively from its precursor inserted into the first material and in an electrolytic bath not containing any precursor of the second material advantageously ensures that the film to be layered is not buried by the second material. This particular embodiment of the present invention thus makes it possible to ensure, when necessary, that the first material, when it is a layering material, is not buried by the second material.

As is seen in the present description, the first material may be placed on the surface by means of any process known to those skilled in the art. The term "placed" is used in the present text to denote in general any type of deposition known to those skilled in the art, for example spraying, dipping, centrifugation, electrografting, electrodeposition, etc. According to the invention, the process for placing the first material on the surface will be chosen by the operator as a function especially of the nature of the surface and of the intended use of the coating manufactured by implementing the process of the invention, in particular of the type of adhesion desired on the surface.

According to the invention, irrespective of the process chosen to place the first material onto the surface, the first material may preferably be placed onto the surface to be coated in the form of a film or layer, and more preferably in the form of an organic film or layer.

Preferably, according to the invention, and when this is possible on account of the nature of the surface, the first material may be placed onto the surface to be coated by means of electrografting. The electrografting may, specifically, be advantageously used when the surface that is intended to be coated by means of the process of the invention is a conductive or semiconductive surface. It allows strong attachment of the first material onto the surface to be obtained.

According to the invention, the first material may be advantageously prepared from a precursor thereof, referred to hereinbelow as the precursor of the first material, chosen from the group consisting of activated or cyclic vinyl monomers, functionalized or non-functionalized diazonium salts, functionalized or non-functionalized sulphonium salts, functionalized or non-functionalized phosphonium salts and functionalized or non-functionalized iodonium salts. Specifically, the first material may advantageously be obtained from one or more of these precursors, for example by electrografting reaction on the surface, for example of an electrically conductive or semiconductive support. Specifically, the electrografting of these precursors on the surface advantageously results in a film of the first material being placed on the surface within the meaning of the present invention.

According to the invention, the first material may be advantageously obtained from a precursor thereof, known as the precursor of the first material, chosen from the group consisting of activated vinyl monomers, cyclic molecules that are cleavable by nucleophilic attack, and diazonium salts.

For example, the activated vinyl monomers that may be used in the present invention may be those having the structure (I) below:

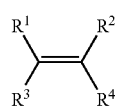

in which $R^1$, $R^2$, $R^3$ and $R^4$ are organic groups chosen, independently of each other, from the group consisting of the following organic functions: hydrogen (H), hydroxyl (—OH), amine (for example —$NH_x$, with x=1 or 3), thiol (—SH), carboxylic acid (—COOH), ester (for example —$COOR^5$, with $R^5$ being a C1 to C6 alkyl), amide (for example —C(=O)$NH_y$, with y=1 or 2), imide, imido-ester, acid halide (for example C(=O)X, X=F, Cl, Br or I), acid anhydride (for example —C(=O)OC(=O)), nitrile, succinimide, phthalimide, isocyanate, epoxide, siloxane (for example —Si(OH)$_z$, with z=1 or 3), benzoquinone, benzophenone, carbonyldiimidazole, para-toluenesulphonyl, para-nitrophenyl chloroformate, ethylenic, vinyl, aromatic, for example toluene, benzene, halobenzene, etc.

In addition, at least one from among $R^1$, $R^2$, $R^3$ and $R^4$ may be a functional group that can complex cations and especially reducible metal cations, for instance copper, iron, nickel, etc. chosen, for example, from the group consisting of amines, amides, ethers, carbonyls, carboxyls and carboxylates, phosphines, phosphine oxides, thioethers, disulphides, ureas, crown ethers, crown azas, crown thios, cryptands, sepulcrates, podands, porphyrins, calixarenes, pyridines, bipyridines, terpyridines, quinolines, ortho-phenanthroline compounds, naphthols, isonaphthols, thioureas, siderophores, antibiotics, ethylene glycol and cyclodextrins.

The film of the first material may also be obtained from substituted and/or functionalized molecular structures from the abovementioned functional groups. Any compound, of molecular or macromolecular size, bearing vinyl groups such as those indicated above, for instance telechelic compounds with vinyl end groups, and in particular telechelic mono- and dimethacrylate, for instance polyethylene glycol dimethacrylate or polydimethylsiloxane dimethacrylate, or alternatively vinyl macromers, i.e. macromolecular compounds mono- or polyfunctionalized with vinyl groups, may also be suitable as precursors of the first material. This last category includes, for example, polymers (vinyl polymers, for instance polyvinyl alcohol, polyacrylic acid or polymethacrylic acid, polyallylamine, etc.; polycondensates, for instance polylactic acid, polyglycolic acid, polyortho esters, polyamides etc., polyethyleneimine etc.), or copolymers, in which all or some of the pendent functional groups have been functionalized with vinyl groups. It is thus possible, for example, to obtain a precursor of the first material by reacting methacryloyl chloride or glycidyl methacrylate on all or some of the OH or NH functional groups of a polymer, for instance polyvinyl alcohol or polyallylamine, and produce, respectively, a polyvinyl alcohol or a polyallylamine functionalized with methacrylate groups. More generally, non-polymer macromolecules, for instance polysaccharides (dextrans, celluloses, heparin, chitosans, etc.), proteins (fibrin, caseine, etc.), oligonucleotides (single-stranded and double-stranded DNA or RNA, etc.), peptidoglycans, in which all or some of certain of their functional groups have been functionalized with vinyl groups, may constitute precursors of the first material. A dextran-GMA functionalized with glycidyl methacrylate groups is obtained, for example, from a dextran of mass M=15 000 and from glycidyl methacrylate (2,3-epoxypropyl methylpropenoate), according to the protocol described in W.N.E. by van Dijk-Wolthuis, O. Franssen, H. Talsma, M. J. van Steenbergen, J. J. Kettenes-van den Bosch, W. E. Hennink, Macromolecules, 1995, 28, 6317. A film 200 nm thick is obtained by electrografting onto gold under voltammetric conditions with 15 sweeps from $E_{initial}$=−0.6 V/($Ag^+$/Ag) to $E_{final}$=−2.8 V/($Ag^+$/Ag) at a speed of 100 mV/s, by dipping a gold leaf, used as working electrode in a 3-electrode assembly, into a solution obtained by dissolving 0.25 g of dextran-GMA in 50 ml of DMF at $10^{-2}$ mol/l of TEAP (the solution is thus about $3.3 \times 10^{-4}$ mol/l of dextran-GMA). Due to the fact that when deposited by electrografting, this film adheres very strongly to the surface and especially withstands ultrasonic rinsing. It thus constitutes a first material of choice, which can receive the precursors of a second material, and in particular metal salts, especially by dipping the leaf in a solvent or a swelling agent containing these metallic precursors.

Finally, the film of the first material may also be obtained from mixtures of the abovementioned chemical precursor compounds, so as to obtain copolymer films, possibly initiated with diazonium salts, constituting the first material within the meaning of the present invention.

For example, according to the invention, when the first material is a polymer obtained by polymerization of a vinyl precursor monomer, it may advantageously be chosen from the group consisting of vinyl monomers, for instance acrylonitrile, methacrylonitrile, methyl methacrylate, ethyl methacrylate, butyl methacrylate, propyl methacrylate, hydroxyethyl methacrylate, hydroxypropyl methacrylate, glycidyl methacrylate, acrylamides and especially amino-ethyl, propyl, butyl, pentyl and hexyl methacrylamides, cyanoacrylates, cyanomethacrylates, polyethylene glycol dimethacrylate and more generally telechelic diacrylates or dimethacrylates, acrylic acid, methacrylic acid, styrene, para-chlorostyrene, N-vinylpyrrolidone, 4-vinylpyridine, 2-vinylpyridine, vinyl halides, acryloyl chloride, methacryloyl chloride, divinylbenzene (DVB), pentaerythritol tetramethacrylate and more generally acrylate-based, methacrylate-based or vinyl-based crosslinking agents, and derivatives thereof.

For example, the cyclic molecules cleavable by nucleophilic attack which may be used in the present invention may be those having the structure (II) below:

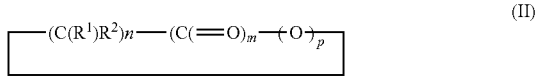
(II)

in which $R^1$ and $R^2$ are independently as defined above, and in which n, m and p are each independently integers from 0 to 20. Included in this category, for example, are epoxides ($R^1$ being an alkyl group as listed above, $R^2$=H, n=1, m=0, p=1), such as ethylene oxide ($R^1$=H, $R^2$=H); lactones ($R^1$ and $R^2$ being alkyl groups as listed above, m=1, p=1), for instance butyrolactone (n=2; $R^1_1$=H, $R^2_1$=H, $R^1_2$=H, $R^2_i$=H; m=1, p=1), ∈-caprolactone (n=5: $R^1_i$=H, $R^2_i$=H, 1≦i≦5; m=1, p=1), etc.

For example, the diazonium salts that may be used in the present invention may be those having the structure (III) below:

(III)

in which $R^3$ is as defined above,
in which Φ is an aromatic nucleus, and
in which X is a negatively charged counterion chosen, for example, from the group consisting of a tetrafluoroborate, a halide, a sulphate, a phosphate, a carboxylate, a perchlorate, a hexafluorophosphate, a ferrocyanide or a ferricyanide.

Examples of diazonium salts that may be used to constitute the first material within the meaning of the present invention are, for example, 4-nitrophenyldiazonium tetrafluoroborates (in which the nitro group can be reduced to amine with complexing properties), 4-carboxybenzenediazonium tetrafluoroborate ($R^3$=COOH) and more generally benzenediazonium tetrafluoroborates para-substituted with groups having complexing properties, and especially those bearing carboxylic acid groups ((—$CH_2$)$_n$—COOH, with n being an integer ranging from 1 to 10), EDTA (ethylenediaminetetraacetate) and similar ligands, etc.; bipyridine, quinolines, amino acids and proteins, mono- and polysaccharides, etc.

All these chemical compounds that are precursors of the first material may, of course, be used alone or as a mixture depending on the objective of the operator implementing the invention.

The first material will be chosen, of course, as a function of numerous criteria, especially the chemical nature of the surface, the material of interest, the chemical nature of the second material if this is not the first material, and also the intended use of the coating manufactured in accordance with the process of the present invention. For example, in the case where it is desired to reinforce a metallic layer by implementing the process of the invention, precursor monomers of a first material in polymer form may advantageously be used, the said polymer advantageously being bearers of functional groups allowing the complexation of the precursor of the second material, for example when this material is in the form of ions.

All these chemical compounds that are precursors of the first material may advantageously be used directly on the surface, for example when the initiation of their polymerization is brought about directly by the metallic surface placed under potential in the manner shown in the attached FIG. 3; or alternatively as a mixture with electro-activatable initiators, which, once reduced or oxidized on the surface, themselves initiate the polymerization: diazonium salts, sulphonium salts, phosphonium salts, iodonium salts, peroxodisulphates, persulphates, thiosulphates, ferrocene, carboxylic acids and especially benzoic acids, peracids, etc. and in general any electroactive compound leading to the formation of initiating radicals once reduced or oxidized.

The step of the process of the invention that consists in depositing the first material onto the surface may be a step consisting in obtaining an organic layer or film of the first material from its abovementioned chemical precursor compounds. It may advantageously take place, for example, by electrolysis in totally or partially organic medium, according to different protocols for placing under potential known to those skilled in the art. Among these, mention may be made of the following: nominal current under intentiostatic conditions, voltammetry, number of sweeps under voltammetric conditions, potential multipulses, intentiostatic jump, potentiostatic jump, etc.

The medium used to place the first material onto the surface by these techniques may comprise, for example, an organic solvent, for instance dimethylformamide (DMF), acetonitrile, water, alcohols or a mixture of these solvents, and optionally a support electrolyte such as tetramethylammonium, tetraethylammonium, tetrapropylammonium or tetrabutylammonium perchlorate (TMAP, TEAP, TPAP or TBAP, respectively), lithium, sodium or potassium perchlorate, sodium or potassium chloride, sodium or potassium nitrate and more generally any salt that is substantially soluble in the electrosynthesis medium.

By way of example, a film of poly(4-vinylpyridine) (P4VP) on gold 20 to 40 nm thick, which may be used in the present invention, may be obtained by performing voltammetric sweeps from −0.7 to −2.9 V/($Ag^+$/Ag) at 200 mV/s on a gold surface dipped into a solution containing 95% by volume of 4-vinylpyridine in DMF, in the presence of $5×10^{-2}$ mol/l of TEAP. The window of thickness mentioned corresponds to different numbers of voltammetric sweeps, the median thickness (30 nm) being obtained with 50 sweeps. All factors being otherwise equal, a film 100 to 150 nm thick is obtained by adding to the above solution 5% by volume of pentaerythritol tetramethacrylate, and by simultaneously copolymerizing these two monomers.

Also by way of example, a film of polymethacrylonitrile (PMAN) on gold about 50 nm thick, which can be used in the present invention, is obtained, in a similar manner, by performing 10 voltammetric sweeps from −0.5 to −2.7 V/($Ag^+$/Ag) at 50 mV/s on a gold surface dipped into a solution containing 2.5 mol/l of methacrylonitrile in DMF, in the presence of $5×10^{-2}$ mol/l of TEAP. The nitrile groups of the polymer formed are identified by the band at 2235 $cm^{-1}$ in IRRAS.

Also by way of example, the formation of an electrografted film of polyhydroxyethyl methacrylate (PHEMA) on gold about 40 nm thick, which can also be used in the present invention, is obtained by performing 10 voltammetric sweeps from +1.0 to −3.0 V/($Ag^+$/Ag) at 50 mV/s on a gold surface dipped into a solution containing 0.4 mol/l of hydroxyethyl methacrylate in DMF, in the presence of $5×10^{-2}$ mol/l of TEAP (tetraethylammonium perchlorate).

Also by way of example, a 300 nm film of PHEMA, which can be used in the present invention, on 316L stainless steel is obtained by performing 40 voltammetric sweeps from −0.6 to −3.0 V/($Ag^+$/Ag) at 100 mV/s on a stainless-steel surface dipped into a solution containing 3.5 mol/l of hydroxyethyl methacrylate (HEMA) in DMF, in the presence of $2.5×10^2$ mol/l of $NaNO_3$ and $10^{-2}$ mol/l of 4-nitrophenyldiazonium tetrafluoroborate.

Also by way of example, an ultrathin covering grafted film of alkylbenzene (R-Φ-) with an estimated thickness of less than 50 nm (and virtually proportional to the size of the alkyl group R), which can be used in the present invention, is obtained on a titanium nitride surface by performing 3 voltammetric sweeps from +1.15 to −1.52 V/(Ag$^+$/Ag) at 20 mV/s on a TiN leaf dipped into a solution containing $5×10^{-3}$ mol/l of alkylphenyldiazonium tetrafluoroborate in acetonitrile, in the presence of $5×10^{-2}$ mol/l of TEAP.

The concentration conditions of the precursor of the first material within the meaning of the present invention, for example monomer or diazonium salt, are variable from one precursor to another and depend on the objective of the operator implementing the invention. Specifically, the concentration of precursor of the first material has an impact on its arrangement on the surface in the first step of the process of the invention, but also on the other steps of the process of the invention, i.e. on the steps of inserting the precursor of the second material into the first material and of forming the second material from its precursor, and also on the properties of the coating obtained.

However, concentrations of between 0.1 and 10 mol/l and in particular between 0.1 and 5 mol/l for the monomers, and $10^{-4}$ and 1 mol/l, and in particular $10^{-3}$ and 0.1 mol/l for the diazonium salts, may be considered as preferential. A person skilled in the art will readily be able to adapt these concentration ranges to the use that he will make of the present invention.

All these chemical compounds that are precursors of the first material have in common the fact that they advantageously result in the formation of structures of "brush" type, as sketched at the top of the attached FIG. 1, which are well configured to serve as armouring structures for the deposition of ordinary non-adhesive solids, in accordance with the process of the present invention.

The scheme of FIG. 1 gives an indication of what may be obtained at a high degree of grafting, i.e. the number of polymer stems per unit area.

With a lower degree of grafting, "hair" or polymer structures layered on the surface will usually be obtained, the armouring properties of which may be substantially poorer than those of brush structures, but which generally satisfy the desired function in accordance with the present invention.

In general, whether it is a matter of performing the electrografting of precursor chemical compounds of the first material of diazonium salt type or of monomer type, the degree of grafting may advantageously be adjusted by the amount of current passed through the electrical circuit used. Specifically, all these electrografting reactions are electro-initiated reactions, in which only the step of attachment of the first precursor consumes an electron, as is shown in the attached FIG. 3, which is equivalent to it occupying a site of the surface. The growth, when it exists, i.e. in the case of the monomer precursors of polymers, is then purely-chemical. The current passed, or more specifically the charge passed, i.e. the integral charge of the current, is thus linked to the number of sites of the surface that have been occupied, and thus to the morphology of the film formed. A person skilled in the art can thus readily predetermine the conditions under which he obtains a film of a given morphology by measuring the degree of grafting obtained, for example by electrochemical impedance spectroscopy, according to the operating conditions, in order to find the solution that is best adapted to the application he is making of the present invention.

When the layer of the first material is deposited according to one of the abovementioned techniques, the second material may be inserted into this layer forming the first material in accordance with the process of the invention. Numerous techniques included in the context of the present invention may be used for this step. However, the inventors have noted that the following techniques are particularly advantageous for implementing the present invention.

Thus, according to one preferred embodiment of the invention, the second material is inserted into the first material using a solution of ionic precursors of this second material. It may be, for example:

an electrolytic bath, for initiating the formation of the second material within the first material by electrodeposition, such as a bath of metallic salts, which is suitable, for example, for the deposition of copper, zinc, gold, tin, etc.; a bath of charged polymers or polyelectrolytes, etc. The bath may optionally contain a mixture of these precursors, so as to produce alloys (several metallic precursors) or organometallic composites (metallic precursors+organic precursors);

a precipitation bath, for precipitating the second material from its precursor in the form of an insoluble salt. In this case also, the bath may optionally contain several types of precursors, so as to produce coprecipitations of several different second materials in the first material.

In the two cases, an important step will consist in ensuring the penetration of the ionic precursors into the organic armouring film.

This assumes that the first material, for example an organic film, can receive this precursor of the second material. If the first material readily receives the precursor of the second material within it, the following precautions will not necessarily be required.

On the other hand, if the first material receives the precursor of the first material less readily or with difficulty, it may be necessary to make this insertion possible or to improve it. To do this, various solutions may be adopted depending on the origin of this difficult insertion. If the origin of this unfacilitated insertion is steric bulk due to the conformation of the first material, which usually appears to be the case, the solution may consist in swelling the first material using a suitable solvent. In the case where the first material is a polymer, this suitable solvent may be, for example, a solvent for the said polymer and/or a solvent or solution for "swelling" the said polymer.

Advantageously, the first material may be at least swollen by the liquid phase containing the ionic precursors of the second material.

For example, when the precursor of the second material is of ionic nature, the solution containing it for its insertion into the first material is preferably a liquid of relatively high dielectric permittivity, which excludes highly apolar solvents.

Since there is a wealth of information in the prior art regarding the production of metallic films by electrodeposition from aqueous solutions, and also regarding the solubility properties (solubility product) in water, the electrografted armouring films which are swollen by water are advantageously suitable in the present invention.

P4VP, as a first material, for example, is swollen with water, as indicated by the result of the attached FIG. 5A: immersion of a P4VP film 100 nm thick for 10 minutes into an aqueous solution containing 5 g/l of copper sulphate leads to the formation of pyridine/cupric ion complexes, which are particularly visible in infrared (IRRAS), which shows the penetration of the cupric ions into the film, whereas the water is not a solvent, but only a swelling agent, for the P4VP.

The same film, removed from the copper sulphate solution and dipped in water, without $CuSO_4$, for 30 minutes, removed again and then dried, gives the same spectrum as that in the attached FIG. 5B, proving that the cupric ions can even be "trapped" in an electrografted film. This result can undoubtedly be linked to the fact that the electrografted film contains complexing groups, and that the pyridine/cupric ion complexes formed are more stable than water/cupric ion complexes. The inventors have in fact noted that the ions may be "removed" from the film by immersion in a solution containing ammonia, which leads to particularly stable complexes with cupric ions, which are manifestly more stable than the pyridine/cupric ion complexes initially formed in the film.

The same type of penetration into the first material, in the form of an electrografted polymer, may be obtained if it is performed in a genuine solvent for the said polymer: thus, the penetration of cupric ions or of zinc(II) ions into a P4VP film or into a polyacrylonitrile (PAN) film is very readily performed using a solution of cupric or zinc(II) ions (respectively) in DMF, which is an organic liquid in which P4VP and PAN are soluble (in solution).

In general, organic solvents with a permittivity lower than that of water do not make it possible to prepare insertion solutions that are as highly concentrated in precursor ions of the second material as is possible in water, since the ions therein are less soluble than in water. However, this drawback may be offset by using particular organic counterions, such as organic counterions that are very soluble in the organic phase, for instance those used in phase-transfer catalysts or in liquid/liquid extraction processes: fatty acid carboxylates (soaps), alkyl sulphonates, alkyl phosphonates, alkyl phosphates etc., which, however, makes the formulation more expensive. The inventors have observed that the penetration of the precursor ions into the electrografted films is generally slower when the concentration in the dipping bath is lower.

For example, in the case where it is difficult to find a liquid that is a good swelling agent for the first material and in which the precursors of the second material can also be dissolved, the third embodiment of the present invention will advantageously be used. This third embodiment may be implemented, for example, by using a solution for grafting the first material onto the surface containing both the precursor of the first material and the precursor of the second material. The electrografting of the first material onto the surface may be performed in the manner described above or by any other suitable technique. Once the grafting of the first material has been performed, a polymer film already containing the precursor of the second material is obtained. Thus, according to this third embodiment, the step of inserting the precursor is performed simultaneously with the step of placing the first material on the surface of the substrate. This embodiment, which avoids an independent step of inserting the precursor of the second material into the first material and also possible washing of the surface before converting the precursor into the second material, can allow time to be saved in the application of the process of the invention. The step of converting the precursor of the second material into the second material may be performed as in the other embodiments of the present invention.

Once the penetration of the precursor ions of the second material into the electrografted film has been performed, according to the invention, the said precursor ions of the second material inserted into the first material are converted into the said second material such that this second material becomes formed on contact of the said surface to be coated and within the said first material placed on the said surface.

According to the invention, this conversion may be performed in the same solution as that used to insert the precursor of the second material into the first material, or in another solution.

For example, when the second material is obtained by electrodeposition of its precursor into the first material, this may be performed using an electrolytic bath containing the precursor ions. The electro-deposition of the second material into the first material may be performed according to a procedure known to those skilled in the art for the preparation of electrolytic deposits. If it is desired to "submerge" the electrografted film in the electrodeposited material, it is preferable for the precursor ions of the second material that are in the electrografted film to also be present in the solution for converting it. Specifically, when the cathodic deposition begins, it leads to the manufacture of a metallic layer within the film, first via the bottom, on the surface to be coated: the ions of the film are attracted by the bottom, which attracts the ions of the solution into the film to continue the growth by deposition of the second material in the film.

According to the invention, the reinforcing bath may thus be the same as the dipping bath which allowed the film to be filled with the precursor ions. Thus, it will advantageously be possible to dip the "empty" film constituting the first material in the dipping solution, wait for the ions to diffuse into the electrografted film, and then activate the protocol for electrodeposition of the second material in the film.

According to this protocol of the invention, a high-quality copper deposit, for example, reinforced with a 200 nm P4VP film on nickel, is obtained by performing the following steps: (i) dipping the film in an aqueous solution containing 50 ml of distilled water, 11 g of [$CuSO_4.5H_2O$], 3 g of $H_2SO_4$ (d=1.83) and 6 mg of NaCl, for 30 minutes; (ii) electrolysis for 15 seconds at the equilibrium potential, and then for 1 minute at −0.5 V/($Ag^+$/Ag) (current density of between 2 and 4 A/$dm^2$), with magnetic stirring.

For example, when the second material is obtained from its precursor by precipitation, this precipitation may be performed using a bath containing the counterions for precipitating a salt of the precursor of the said second material. This procedure is, of course, preferably performed with a bath that is different from the one used for dipping, so as to avoid precipitation in all of the reinforcing bath.

For example, by means of this protocol, a deposit of silver chloride on a nickel surface, reinforced with P4VP, is obtained by dipping a nickel leaf bearing an electrografted P4VP film 200 nm thick into a 5 g/l silver nitrate solution for 30 minutes, followed by removing the leaf and dipping it for a few minutes, after rinsing with deionized water, into a 10 g/l sodium chloride solution.

The same operation performed, for example, on a nickel leaf bearing no electrografted P4VP film does not lead to any deposit after treatment with the NaCl solution.

Now that the principle of forming the deposit within the electrografted armouring organic coating has been described in detail, advantageous variants of the process of the invention are described below:

the penetration of the precursor of the second material into the first material, if the precursor of the second material is in the form of precursor cations, may advantageously be accelerated if it is performed at a slightly cathodic potential, which will allow the cations to be attracted into the film. The only problematic parameter is that of being able to find a potential that is sufficiently cathodic to ensure electrostatic attraction and a migration current, and sufficiently sparingly cathodic to perform the reduction of these ions of the precursor in order to form the second material, unless it is desired to perform the two steps simultaneously;

the conversion of the precursor of the second material, when it consists of a reduction of precursor ions, may advantageously be performed via the chemical redox route, instead of an electrodeposition, by dipping the electrografted organic film, constituting the first material, containing the precursor ions, into a solution of chemical reducing agents. For example, a film of reinforced silver on nickel is obtained by dipping a nickel leaf covered with an electrografted 200 nm P4VP film into a 5 g/l silver nitrate solution for 30 minutes, followed by dipping it for a few minutes, after rinsing with deionized water, into a glucose solution heated to 80° C. However, it will be noted that this type of protocol does not generally allow the armouring layer to be completely buried in the second material, given the absence of ions of the precursor of the second material in the solution to make up the amount, by diffusion into the electrografted film, of the precursor ions consumed by the process for converting the precursor of the second material into the second material.

Electrografting makes it possible, for example, to produce, by means of the formation of covalent bonds at the surface/first material interface, particularly solid armouring between the surface and the complementary material.

As indicated above, a deposit of the first material on the surface leading to a weaker bond than an electro-grafting of the said first material may also be performed, by means of the process of the invention. This leads, for example, to armouring, consisting of the first material, which is intrinsically less solid but, nevertheless, acceptable depending on the intended application.

This may be performed by depositing the first material, for example in the form of an organic coating, via processes that are simpler than electrografting, such as dipping ("dip-coating"), centrifugation ("spin-coating") or spraying. These three deposition modes are well known to those skilled in the art.

It is known, for example, that it is possible to control the thickness of an organic deposit by centrifugation by adjusting the concentration of the polymer in the deposition solution, the speed of rotation of the device and the operating time. In the dipping protocol, it is the speed of descent, but above all of ascent, of the object in the polymer solution that replaces the rotational speed parameter of centrifugation, and enables good control of the thickness of the polymer. In the spraying protocol, the thickness may be controlled by controlling the size of the drops, their ejection speed (via the geometrical characteristics of the nozzle and the pressure of the carrier gas, especially) and the distance between the nozzles and the surface to be treated. These factors fall perfectly within the implementation of the present invention since they make it possible to adjust the deposition of the first material onto the surface in the process of the invention.

The inventors have, for example, obtained a deposit of silver chloride on a nickel surface, reinforced with P4VP, by first producing a P4VP deposit by dipping the leaf in a solution containing 5% by mass of P4VP in DMF. The leaf thus prepared was dried in an oven at 40° C. under a primary vacuum for 4 hours, dipped into a 5 g/l silver nitrate solution for 30 minutes, and then removed, rinsed with deionized water and dipped for a few minutes into a 10 g/l sodium chloride solution. The same operation, performed on a nickel leaf not bearing a P4VP film, does not give any deposit after treatment with the NaCl solution. The same type of film may readily be obtained using a P4VP film deposited by centrifugation, or alternatively by a PHEMA film deposited by dipping or by centrifugation.

The processes for inserting the precursor of the second material and for its conversion into the second material within the first material are the same as those considered in the previous paragraphs with the electrografted films. It will merely be noted, compared with the case of the abovementioned electrografted polymers, that it is preferable to select insoluble polymers in this case. In addition, these polymers are preferably chosen such that they can be swollen with the liquid of the reinforcing solution, but preferably not dissolved, so as to avoid washing the surface with the solution for inserting the precursor of the second material therein. Any polymer may be suitable in principle. In order for a polymer to be eligible, it suffices to know a solvent and a swelling agent therefor in which the precursors of the reinforcing material are soluble. The solvent is used to dissolve the polymer at the time of its application to the surface, for example by centrifugation ("spin-coating"), and the swelling agent is used to insert the precursor of the reinforcing material.

The inventors have, for example, obtained a deposit of silver chloride on a nickel surface, reinforced with P4VP, by producing a deposit of P4VP filled with silver ions by dipping the leaf in a P4VP solution at 5% by mass in DMF, saturated with silver nitrate. The leaf thus prepared was dried in an oven at 40° C. under a primary vacuum for 4 hours, and then dipped for a few minutes in a 10 g/l sodium chloride solution.

When the first material is a material to be layered, for example onto a conductive or semiconductive surface, it may be deposited by dipping or centrifugation using a layering solution containing this first material, which is preferably macro-molecular, and preferentially polymeric.

As specified above, these two deposition processes are well known to a person skilled in the art, who knows how to adjust in particular the thickness of the organic deposit, and can be used in the present invention since they allow the deposit of the first material on the surface in the process of the invention to be adjusted.

Thus, for example, by dipping a 316L stainless-steel leaf into a poly(lactic acid-co-glycolic acid) (PLAGA, 50:50, MM=50-75 000 g/mol, Aldrich) solution at 1% by mass in chloroform for 3 minutes, a uniform PLAGA film (measured by profilometry at the top and bottom of the leaf) of 200 nm is obtained by withdrawing the leaf at a speed of 0.05 cm/s, and a 400 nm film is obtained by withdrawing the leaf at a speed of 0.15 cm/s.

Once the film to be layered, constituting the first material within the meaning of the present invention, has been deposited on the surface, the next step of the process of the invention is performed, i.e. the step of inserting the second material into the first material. This in fact amounts to layering within the meaning of the invention. It may be performed by dipping the surface bearing this film into a solution containing ionic precursors of the second material. This bath, which may be referred to as a reinforcing bath, will contain, for example, metallic cations, precursors of the second material which will be in the form of a metallic layer within the organic film to be layered. This example is illustrated schematically in the attached FIG. 2.

It may be a bath such as those mentioned above. In this case also, an important step will consist in ensuring the penetration of the ionic precursors into the organic armouring film. The processes and solvents used herein are the same as those described above.

As for the armouring protocol described previously, it may be advantageous to place, in the polymer to be layered, groups capable of complexing the ions of the reinforcing solution. However, since the layering according to the invention is performed rather to attach a specific organic material to a conductive or semiconductive surface, chosen for its intrinsic properties, it is possible for this material not to contain any complexing groups. As illustrated in the working examples below, layering is nevertheless possible in the latter case by means of the process of the invention.

In the case, for example, where it is difficult to find a liquid that is a good swelling agent for the first material and in which the precursors of the second material can also be dissolved, the third embodiment of the present invention will advantageously be used. Specifically, if no swelling agent is suitable, it is possible, according to the invention, to use a solvent that dissolves the precursors of the second material and that can also deposit the first material onto the surface. This third embodiment may be implemented, for example, using a solution containing both the first material, for example the layerable polymer, and the precursor of the second material, for example the reinforcing material. The deposition of the first material may be performed, for example, by centrifugation ("spin-coating") or by any other suitable technique indicated in the present text. Once the deposit has been produced, a polymer film which already contains the precursors of the second material is obtained. Thus, according to this third embodiment, the step of inserting the precursor is performed simultaneously with the step of depositing the first material onto the surface of the substrate. This embodiment, which avoids an independent step of inserting the precursor of the second material into the first material and also possible washing of the surface before converting the precursor into the second material, allows time to be saved in the application of the process of the invention. The step of constructing the reinforcing material within the layerable material remains unchanged.

Once the penetration of the precursor of the second material into the first material has been performed, the precursor is converted into the said second material in a solution that allows one or other of the abovementioned processes to be performed.

For example:

the electrodeposition may be performed in an electrolytic bath that preferably does not contain the precursor ions, and the conversion of the precursor is performed according to a procedure known to those skilled in the art for the preparation of electrolytic deposits. This embodiment avoids the electrografted film from being "submerged" in the electrodeposited material, as shown in FIG. 2. For example, a highly adhesive deposit of PHEMA on nickel or on 316L stainless steel is obtained by performing the following steps: (i) dipping the leaf in a solution containing 5% by mass of PHEMA in DMF; (ii) drying the leaf with a hairdryer for 20 seconds (the film obtained has a thickness of about 200 nm); (iii) dipping the film for 3 minutes in an aqueous solution containing 50 ml of distilled water, 11 g of $CuSO_4.5H_2O$, 3 g of $H_2SO_4$ (d=1.83) and 6 mg of NaCl; (iv) removing the leaf and dipping it in a solution identical to the above solution, but not containing copper sulphate, followed by electrolysis for 15 seconds at the equilibrium potential, and then for 30 seconds at $-0.5$ V/($Ag^+$/Ag) (current density of between 2 and 4 A/dm$^2$), with magnetic stirring. The leaf is finally rinsed for 2 minutes by ultrasound in DMF. A film of PHEMA on the layered surface is observed, whereas no PHEMA film is detected on the same leaf that is not layered (deposition of the PHEMA by dipping, dipping in the successive solutions, without electrolysis);

the precipitation may also be performed in a bath containing the counterions for precipitating a salt of the precursor ion that has been inserted into the film. This procedure is, of course, preferably performed using a different bath from the one used for the insertion of the precursor into the first material, so as to avoid precipitation in all of the reinforcing bath. For example, an adhesive P4VP deposit on nickel is obtained by dipping a nickel leaf in a solution containing 5% P4VP in DMF, then into a 5 g/l silver nitrate solution for 3 minutes, followed by removing the leaf and dipping it for a few minutes, after rinsing with deionized water, into a 10 g/l sodium chloride solution, followed by rinsing with ultrasound for 2 minutes in DMF. The same operation, performed without the step of inserting the precursor of the second material into the silver nitrate solution, leaves no P4VP film after rinsing with DMF. See also the example included above, in which the deposition of a P4VP film already charged with silver ions is performed.

The two advantageous variants of the process of the invention described above are also applicable here. As regards the accelerated penetration of the cations of precursor of the second material, the amount of metal electrodeposited into the film may advantageously be controlled by controlling the charge passing during the electrodeposition.

The working examples that follow are intended to illustrate the attachment of various materials to electrically conductive or semiconductive surfaces, and to characterize the products obtained. They are given for illustrative and non-limiting purposes, with reference to the attached drawings.

BRIEF DESCRIPTION OF THE FIGURES

FIG. 3B is the main parasite chemical reaction leading to the non-grafted polymer.

FIG. 9B allows a comparison of the electrolysis current obtained in the presence of a polyhydroxyethyl methacrylate (PHEMA) film, recorded as a continuous line, relative to that obtained in the absence of a film, as obtained in Example 7 below, recorded as dotted lines.

FIG. 10A shows the spectrum of a virgin PHEMA film 150 nm thick deposited onto a gold leaf. FIG. 10B shows the spectrum of a PHEMA film 150 nm thick deposited onto a gold leaf and treated in a solution of copper ions by dipping followed by electrolysis under the conditions of FIG. 9B, as a continuous line. FIG. 10C shows the Tr spectrum (%)=f(No (cm$^{-1}$) of a PHEMA film obtained under the conditions described for 10B and then subjected to ultrasound in DMF for 2 minutes.

In these figures, "S" represents the surface that is intended to be or that is coated by means of the process of the invention;

"1M": the first material within the meaning of the present invention; "2M": the second material within the meaning of the present invention; "P2M": the precursor of the second material within the meaning of the present invention; "tr (%)": the percentage transmission; "No (cm$^{-1}$)": the wavenumber in cm$^{-1}$; "cps (a.u.)": number of counts per second, in arbitrary units; "Eb (eV)": the bonding energy in eV; "I (A)": the current in amperes; "U (V)": the voltage in volts; "t (s)": the time in seconds.

EXAMPLES

Example 1

Figure 1:
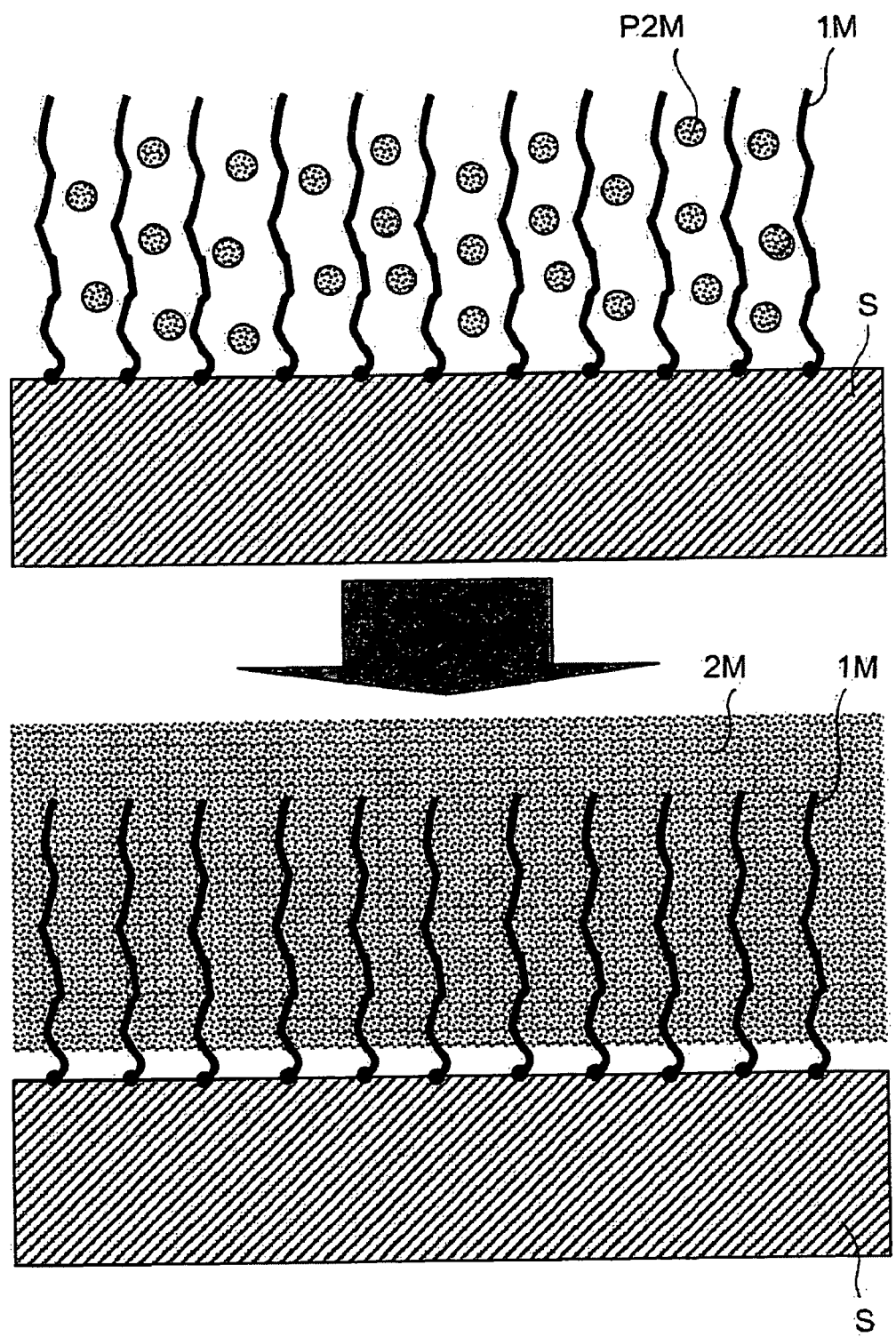
FIG. 1 is a schematic representation of a highly adhesive attachment of metal (reinforcing material) to a conductive or semiconductive surface (substrate), using armouring consisting of an electrografted polymer film, in accordance with the first embodiment of the present invention. It involves, for example, the attachment of copper to gold or to titanium nitride, by armouring using a poly(4-vinylpyridine) film.
Figure 2:
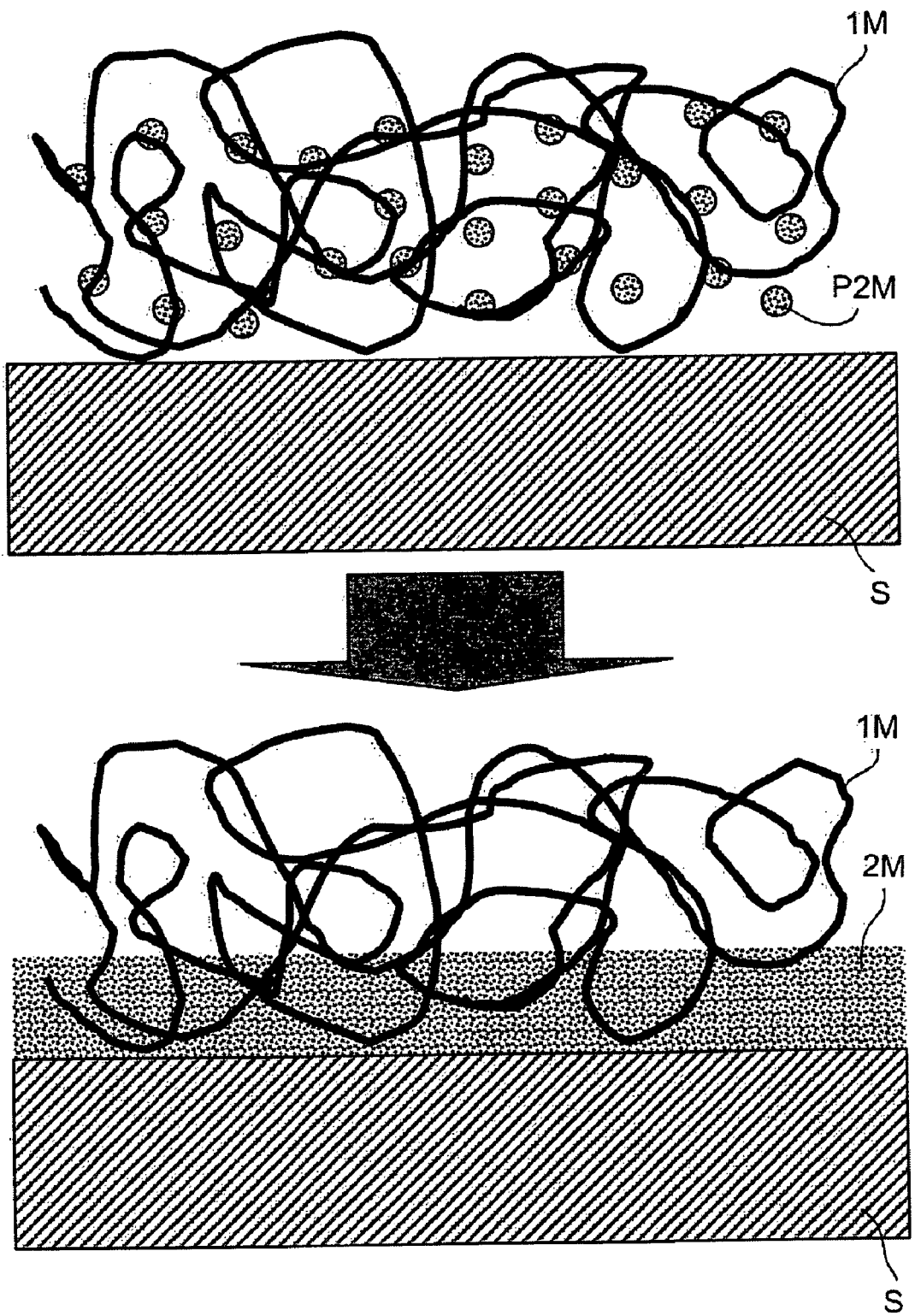
FIG. 2 is a schematic representation of the second embodiment of the present invention, when the first material is simply deposited on the surface, and the second material reinforces the attachment of the first material to the surface. It involves, for example, the layering of polyhydroxyethyl methacrylate (PHEMA) onto nickel with the aid of a reinforcement by electrodeposition of copper.
Figure 3A:
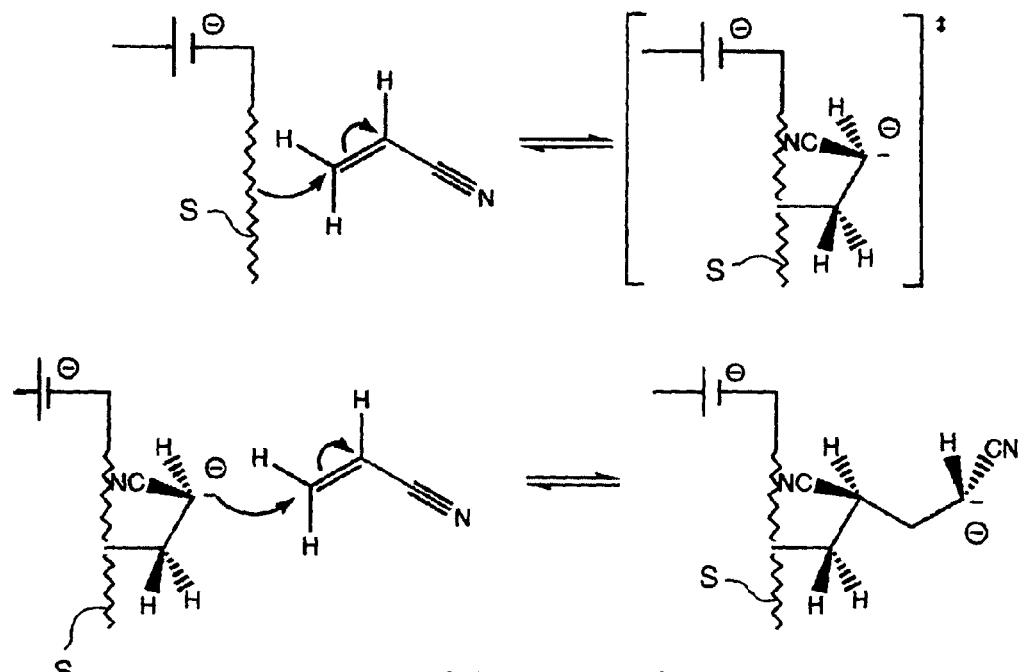
FIGS. 3A and 3B are schemes of reaction mechanisms for the electrografting of acrylonitrile by cathodic polarization. The grafting reaction corresponds to FIG. 3A in which the growth takes place from the surface (S).
Figure 3B:
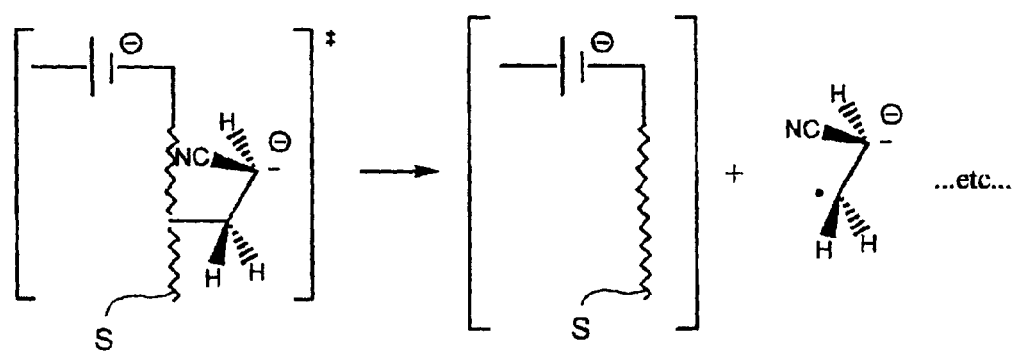
Figure 4:
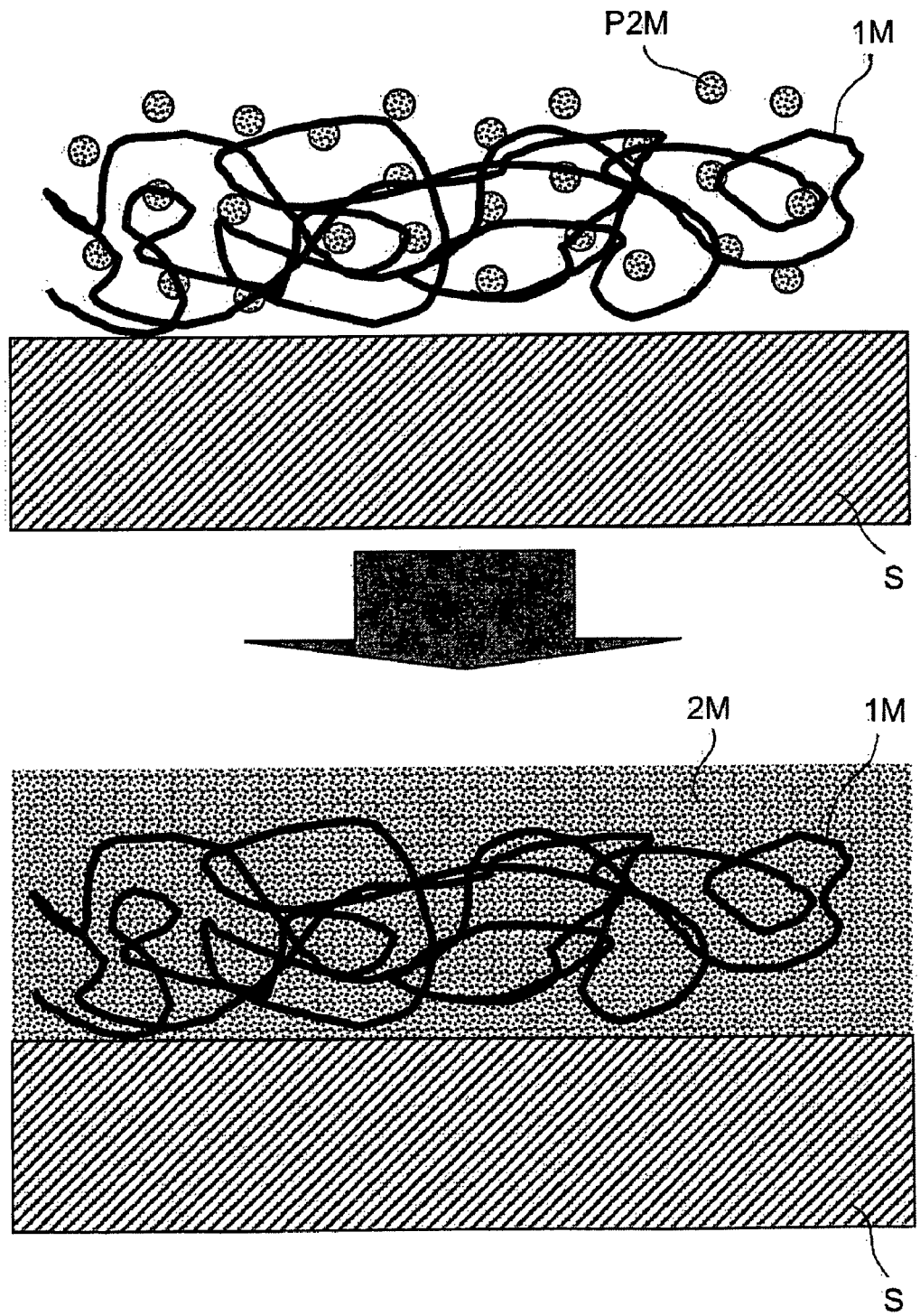
FIG. 4 is a schematic representation of the first embodiment of the present invention, when the first material simply deposited on the surface forms armouring of the second material.
Figure 5A:
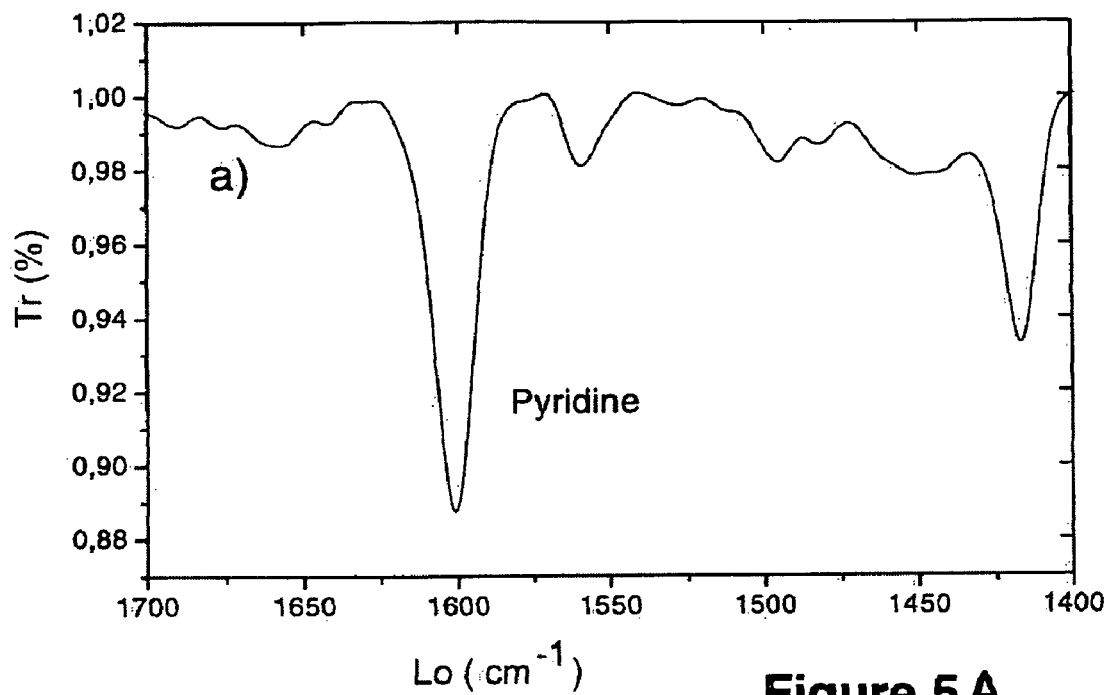
FIGS. 5A and 5B are infrared spectra (IRRAS) of P4VP films 100 nm thick on nickel before (a) and after (b) dipping 10 minutes in an aqueous solution containing 5 g/l of copper sulphate. The splitting of the peak at 1617 cm$^{-1}$ is characteristic of the formation of copper/pyridine complexes, proving the penetration of the solution into the film.
Figure 5:
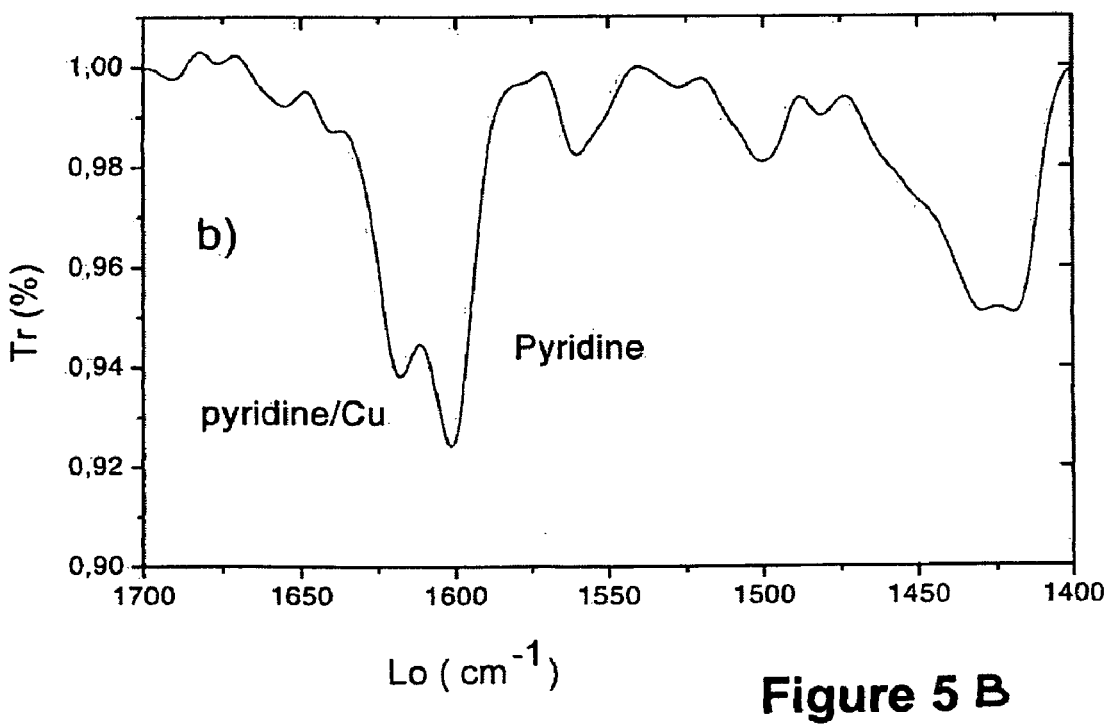

Attachment of Copper to a Gold Surface by Armouring Using an Electrografted P4VP Film This example illustrates the very adhesive attachment of copper to a gold surface, using armouring consisting of an electrografted poly(4-vinylpyridine) (P4VP) film. FIG. 1 is a schematic representation of this example in accordance with the present invention.

An electrografted P4VP film 30 nm thick is first prepared on a 316L stainless-steel leaf subjecting the surface, dipped into a solution containing 40% by volume of 4-vinylpyridine in DMF, in the presence of $5 \times 10^{-2}$ mol/l of TEAP, to 50 voltammetric sweeps from –0.7 to –2.9 V/(Ag$^+$/Ag) at 200 mV/s.

The leaf thus treated is rinsed with DMF, dried under a stream of argon and then dipped for 25 minutes in a solution of 10 g of copper sulphate [CuSO$_4$.5H$_2$O] in 200 ml of deionized water. The leaf is then rapidly rinsed with a few jets of deionized water, and then dipped into DMF. It is then subjected to cathodic polarization at a constant potential of –1.15 V/SCE for a time T.

Three leaves prepared in the same manner are thus treated, at polarization times, respectively, of T=50 (L1), 120 (L2) and 240 (L3) seconds.

The leaves are then rinsed with DMF by ultrasound for 2 minutes, and dried under a stream of argon. They are shown in the attached FIG. 6.

They are analyzed by photoelectron spectroscopy. The results of this analysis are shown in the attached figure. In this figure, the leaf spectrum (a) is the one obtained, in the zone of 2p orbitals of copper, just after the step of dipping in the cupric ion solution, i.e. before depositing the reinforcing material into the P4VP film. The 2p$^{1/2}$ and 2p$^{3/2}$ lines of the cupric ions are observed therein, at about 938 and 958 eV, respectively. Spectrum (b) is the one obtained after polarization for 50 s, which shows, after rinsing, essentially the cupric ions, and a very small shoulder at about 932 eV, characteristic of the 2p$^{3/2}$ levels of metallic copper. Spectra (c) and (d) are those obtained, respectively, after depositing the reinforcing material following polarization for 120 and 240 s: they clearly show the disappearance of the peaks of the 2p levels of the cupric ions, to the profit of those of the 2p levels of metallic copper, showing the formation of the reinforcing material on the 316L stainless-steel surface, within the P4VP film.

Figure 6:
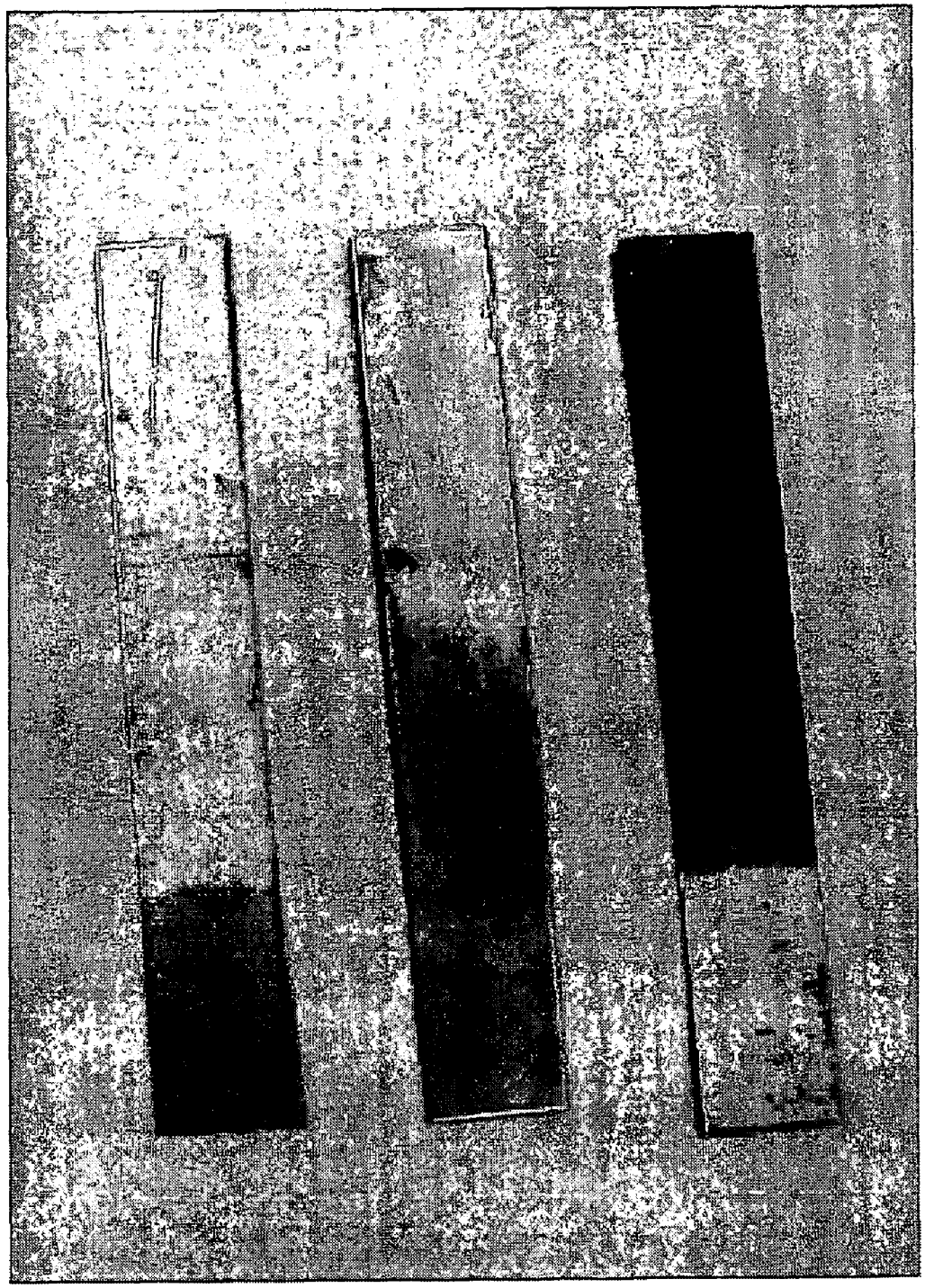
FIG. 6 is a photograph of three leaves obtained by attaching copper to a gold surface by means of armouring consisting of a P4VP film electrografted in accordance with the process of the present invention. The deposited copper is obtained by a potentiostatic electrodeposition of variable duration. From left to right, the result of an electrodeposition for 50, 120 and 240 seconds, respectively, is observed.
Figure 7:
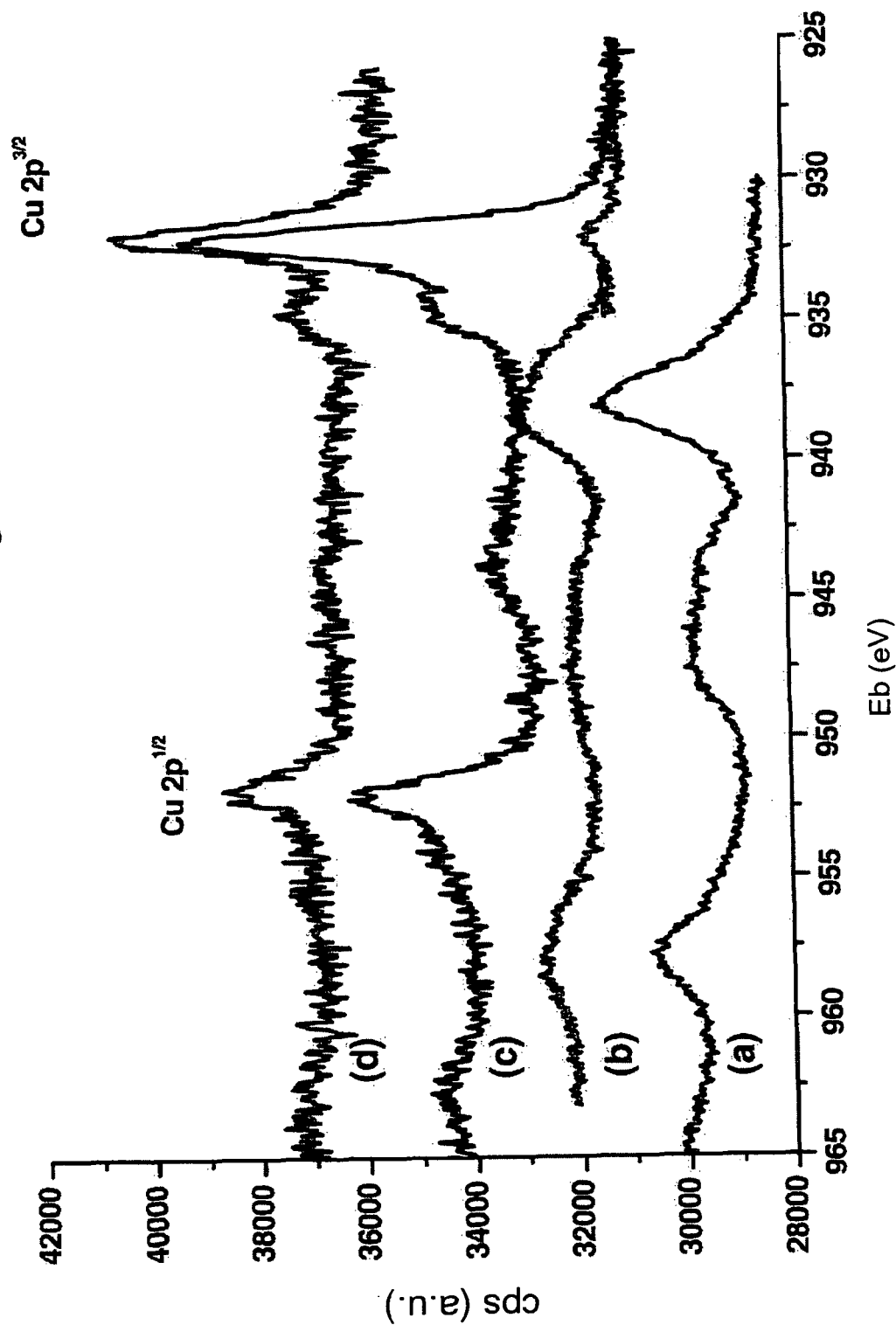
FIG. 7 reviews X-ray photoelectron spectra (XPS) of the leaves in FIG. 6, in the region of the 2p orbitals of copper. Spectrum (a) is the one obtained after dipping stainless-steel leaves covered with an electrografted P4VP film into the solution of cupric ions (see Example No. 1); spectra (b), (c) and (d) are those obtained after electrodeposition of copper in, and armouring with, the P4VP films, showing the gradual conversion of the cupric ions of the film into copper atoms.

As shown by the images of the attached FIG. 6, the formation of a deposit of copper on the surface is clearly observed for the leaves that have undergone a sufficient polarization. This deposit is adhesive. In particular, it withstands rinsing for 2 minutes by ultrasound in DMF.

In comparison, a deposit of copper prepared under the same conditions but in the absence of a P4VP film leads to a non-adhesive powdery deposit, which is almost entirely removed by rinsing with DMF by ultrasound.

Example 2

Attachment of Copper to a Gold Surface by Armouring Using an Electrografted P4VP Film (II)

The experiment of Example 1 is repeated, but using a different electrodeposition solution, which is conventional in spent-bath electroplating and also in barrel electroplating, providing a glossy deposit of copper of better quality. This example illustrates the compatibility of the armouring with electroplating processes, and thus makes it possible to benefit from reinforcement of the copper/gold interface while at the same time satisfactorily depositing the material of interest, consisting of the copper, according to the same process as usual.

To do this, the gold leaf covered with an electrografted P4VP film is dipped into an aqueous solution containing 50 ml of distilled water, 11 g of $CuSO_4.5H_2O$, 3 g of $H_2SO_4$ (d=1.83) and 6 mg of NaCl, for 30 minutes, and then electrolyzed in the solution for 15 seconds at the equilibrium potential, and then for 3 minutes at $-0.5$ $V/(Ag^+/Ag)$ (current density of between 2 and 4 $A/dm^2$), with magnetic stirring.

A very shiny, uniform deposit of copper is obtained, which shows good adhesion to the surface, since it withstands rinsing by ultrasound in DMF for 2 minutes, whereas the same deposit is impaired under the same rinsing conditions without prior armouring.

Example 3

Attachment of Nickel to a Gold Surface by Armouring by Means of an Electrografted P4VP Film The same experiment as in Example 2 is performed, but using a reinforcing solution of nickel(II) ions, precursors of a deposit of metallic nickel, containing 50 ml of deionized water, 12.5 g of nickel sulphate, 3.25 g of nickel chloride and 2 g of boric acid.

A gold leaf covered with an electrografted P4VP film 30 nm thick is dipped into the solution thus prepared for 30 minutes, and then electrolyzed in the above solution for 15 seconds at the equilibrium potential, and then for 3 minutes at a cathode current density of between 2 and 4 $A/dm^2$, with magnetic stirring.

A nickel deposit that shows good adhesion to the surface is obtained, since it withstands rinsing by ultrasound in DMF for 2 minutes, whereas the same deposit is impaired under the same rinsing conditions without prior armouring.

Example 4

Attachment of Copper to a Gold Surface by Armouring by Means of an Electrografted PHEMA Film This example illustrates the preparation of armouring with an electrografted PHEMA film. In contrast with Example 2, this polymer contains no functional groups that can act as complexing agents with respect to the cupric ions of the reinforcing solution.

An electrografted film of polyhydroxyethyl methacrylate (PHEMA) of about 40 nm is produced on a gold leaf similar to those of the preceding examples, dipped into a solution containing 0.4 mol/l of hydroxyethyl methacrylate in DMF, in the presence of $5 \times 10^{-2}$ mol/l of TEAP (tetraethylammonium perchlorate), by performing 10 voltammetric sweeps from $+1.0$ to $-3.0$ $V/(Ag^+/Ag)$ at 50 mV/s.

The leaf thus obtained is dipped into an aqueous solution containing 50 ml of distilled water, 11 g of $CuSO_4.5H_2O$, 3 g of $H_2SO_4$ (d=1.83) and 6 mg of NaCl, for 30 minutes, and then electrolyzed in the solution for 15 seconds at the equilibrium potential, and then for 3 minutes at $-0.5$ $V/(Ag^+/Ag)$ (current density of between 2 and 4 $A/dm^2$), with magnetic stirring.

A very shiny uniform deposit of copper is obtained, which shows good adhesion to the surface, since it withstands rinsing by ultrasound in DMF for 2 minutes, whereas the same deposit is impaired under the same rinsing conditions without prior armouring.

Example 5

Attachment of Copper to a 316L Stainless-Steel Surface by Armouring Using an Electrografted PHEMA Film This example illustrates the preparation of armouring with a polymer film electro-initiated using diazonium salts, free-radical polymerization precursors, rather than using a polymer film strictly electrografted using a solution containing only vinyl monomers. Good-quality armouring is observed, even though it is not prepared with an electrografted film. In addition, the production of armouring on a metal of those used in the preceding examples is observed.

A 300 nm film of PHEMA is formed on 316L stainless steel by performing 40 voltammetric sweeps from $-0.6$ to $-3.0$ $V/(Ag^+/Ag)$ at 100 mV/s on a 316L stainless-steel surface dipped into a solution containing 3.5 mol/l of hydroxyethyl methacrylate (HEMA) in DMF, in the presence of $2.5 \times 10^{-2}$ mol/l of $NaNO_3$ and $10^{-2}$ mol/l of 4-nitrophenyldiazonium tetrafluoroborate.

The leaf thus obtained is dipped into an aqueous solution containing 50 ml of distilled water, 11 g of $CuSO_4.5H_2O$, 3 g of $H_2SO_4$ (d=1.83) and 6 mg of NaCl, for 30 minutes, and then electrolyzed in the solution for 15 seconds at the equilibrium potential, and then for 5 minutes at $-0.5$ $V/(Ag^+/Ag)$ (current density of between 2 and 4 $A/dm^2$), with magnetic stirring.

A very shiny uniform deposit of copper is obtained, which shows good adhesion to the surface, since it withstands rinsing by ultrasound in DMF for 2 minutes, whereas the same deposit is impaired under the same rinsing conditions without prior armouring.

Example 6

Attachment of P4VP to a Gold Surface by Electrochemical Layering with Copper This example illustrates the attachment of a polymer to a metallic surface by layering, the polymer being simply deposited by electrodeposition onto the surface onto which it is desired to attach it.

A P4VP deposit of about 100 nm is thus produced, by electrodeposition using a solution containing 5% by mass of P4VP in DMF, on a gold leaf similar to that of the preceding examples. The leaf thus treated is dried with a hairdryer and then dipped for 25 minutes in a solution containing 10 g of copper sulphate in 200 ml of deionized water. The leaf is then rinsed with deionized water and then dipped in an electrolysis bath containing 2 g of copper sulphate and 3 g of NaCl in 500 ml of deionized water. The leaf is then subjected to 10 voltammetric sweeps between 0 and −0.5 V/SCE at 200 mV/s, removed, rinsed with deionized water and then decomplexed from the excess cupric ions by dipping for 20 minutes in an aqueous 10% ammonia solution, and finally rinsed by dipping in a DMF solution for 2 hours 30 minutes.

Figure 8:
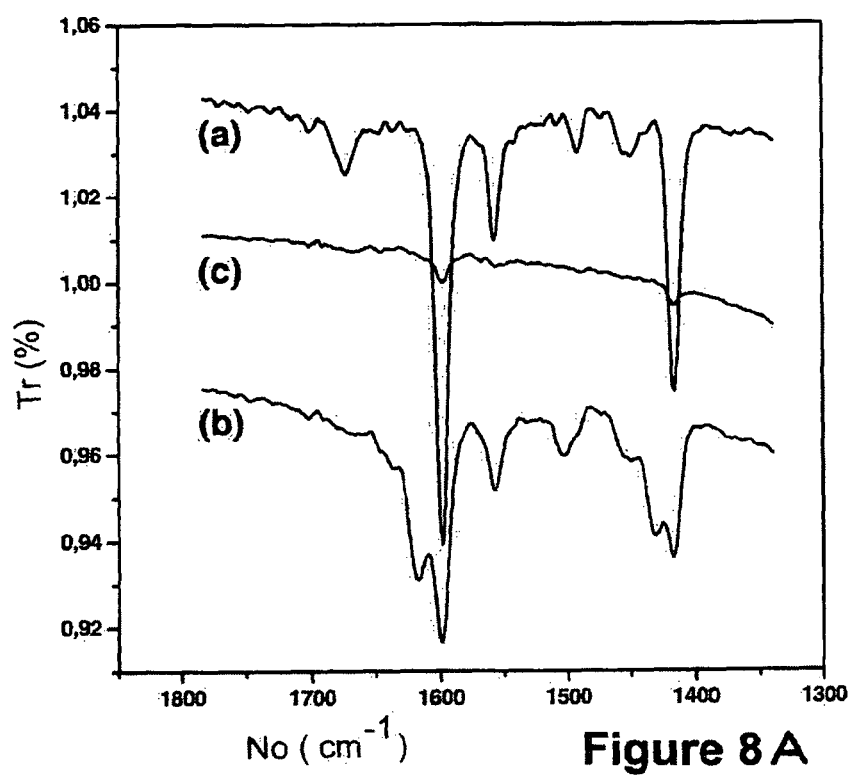
FIGS. 8A and 8B are infrared spectra of leaves obtained when a P4VP film is deposited by layering with copper (8B (d-f)), in comparison with those in which the layering is not performed (8A (a-c)). Spectra (a) and (d) are identical and correspond to the P4VP film deposited onto the gold surface by centrifugation. Spectra (b) and (d) are obtained after dipping the leaf thus coated with the P4VP film into a concentrated copper solution. Spectrum (c) is the one obtained by simply performing the steps of rinsing the leaf directly after dipping in the complexing solution, without performing the layering: it is observed that the leaf has been almost completely washed off. In contrast, spectrum (f) is the one obtained by performing the layering before the rinsing protocol: the characteristic bands of the P4VP film as originally deposited are clearly observed, the difference being that this film has withstood rinsing with DMF for 2 hours 30 minutes. A simple test shows that it also withstands rinsing by ultrasound for 2 minutes with DMF, which gives it very good adhesion to the gold surface.
Figure 8:
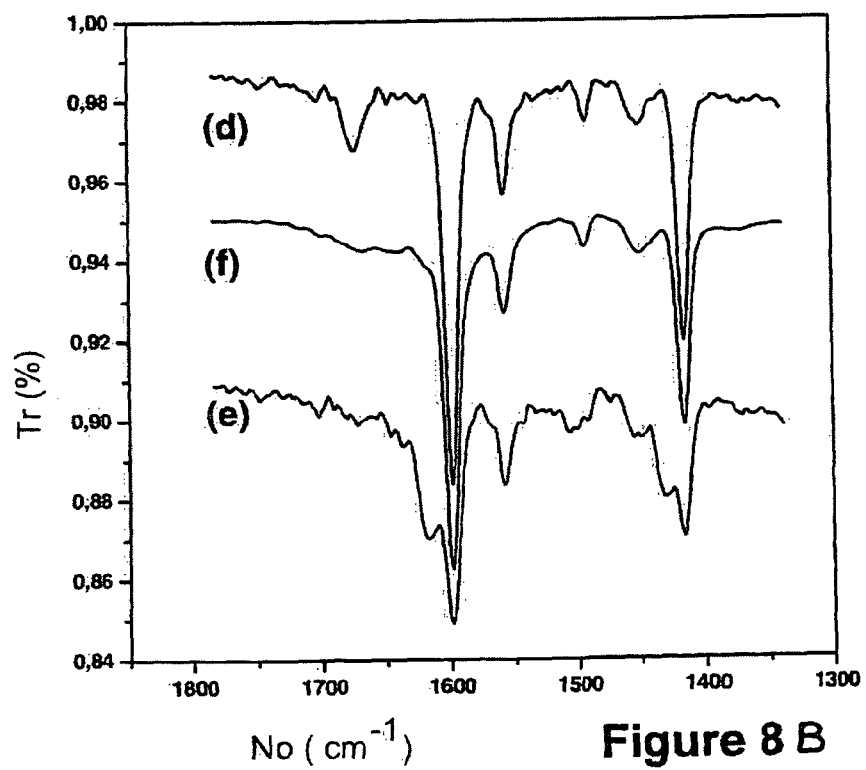

FIG. 8 shows the infrared spectra of the leaves obtained in the various steps above in the region of the vibration modes of the pyridine ring of the polymer. Spectra (a) and (d) are identical, and correspond to the P4VP film deposited onto the gold surface by electrodeposition. The band at 1600 cm$^{-1}$ is characteristic of the pyridine group. Spectra (b) and (d) are obtained after dipping the leaf covered with the P4VP film into the concentrated copper solution: splitting of the above peak is observed, with appearance of a second peak at about 1620 cm$^{-1}$, which is characteristic of the complex formed between pyridine rings and cupric ions. Spectrum (c) is the one obtained by simply performing the steps of rinsing the leaf directly after dipping in the complexing solution, without forming the layering: it is observed that the leaf has been almost completely washed. In contrast, spectrum (f) is the one obtained by performing layering before the rinsing protocol: the characteristic bands of the P4VP film as originally deposited are clearly observed, with the difference that this film withstood rinsing with DMF for 2 hours 30 minutes. A simple test shows that it also withstands rinsing with DMF for 2 minutes by ultrasound, which gives it very good adhesion to the gold surface.

Example 7

Attachment of PHEMA to a Nickel Surface by Electrochemical Layering with Copper This example illustrates the layering of a polymer containing no functional groups that complex the precursor ions of the reinforcing bath. It is observed that the layering may also be performed under these conditions.

A PHEMA film about 200 nm thick is first produced by centrifugation on a nickel leaf with a solution containing 5% PHEMA in DMF, followed by drying with a hairdryer.

Figure 9:
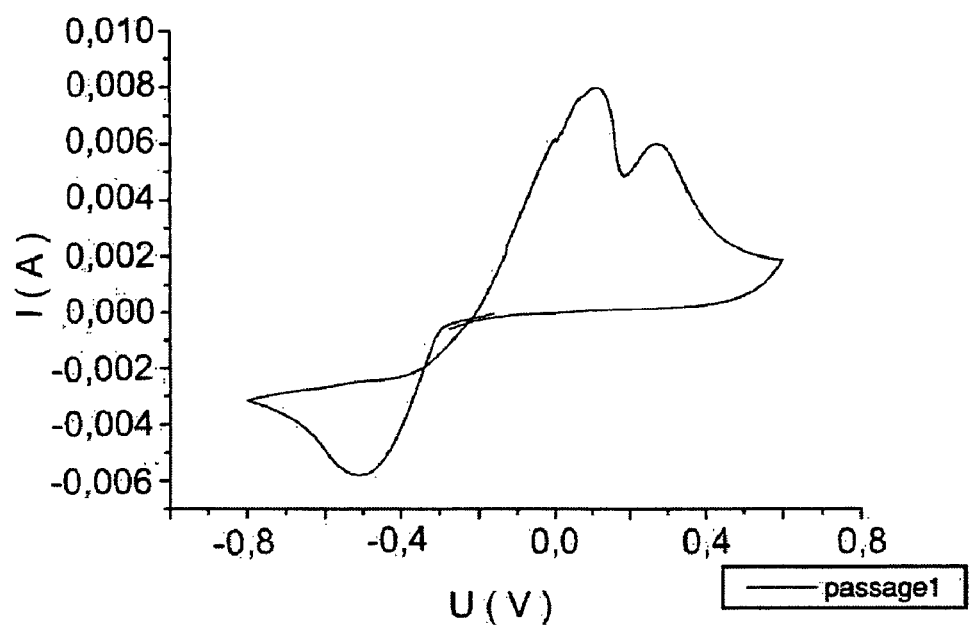
FIGS. 9A and 9B respectively show a voltammogram of the solution used for the deposition of cupric ions onto a virgin electrode, and allowing the deposition potential of the precursor material (copper salts) to be defined.
Figure 9:
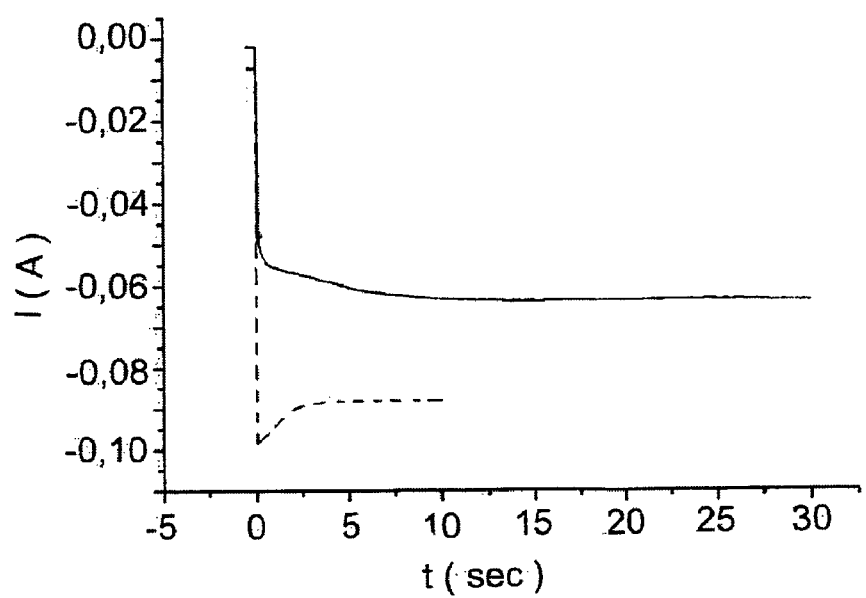

The leaf thus obtained is partially dipped into an aqueous solution containing 50 ml of distilled water, 11 g of CuSO$_4$.5H$_2$O, 3 g of H$_2$SO$_4$ (d=1.83) and 6 mg of NaCl, for 3 minutes, and then electrolyzed in the solution for 15 seconds at the equilibrium potential, and then for 30 seconds at −0.5 V/(Ag$^+$/Ag) (current density of between 2 and 4 A/dm$^2$), with magnetic stirring. FIG. 9B compares the electrolysis current obtained in the presence of the PHEMA film (continuous line) relative to that obtained in the absence of the film (broken line). When the electrolysis is complete, the leaf is rinsed, first simply with DMF, and then for 2 minutes by ultrasound in DMF.

Figure 10:
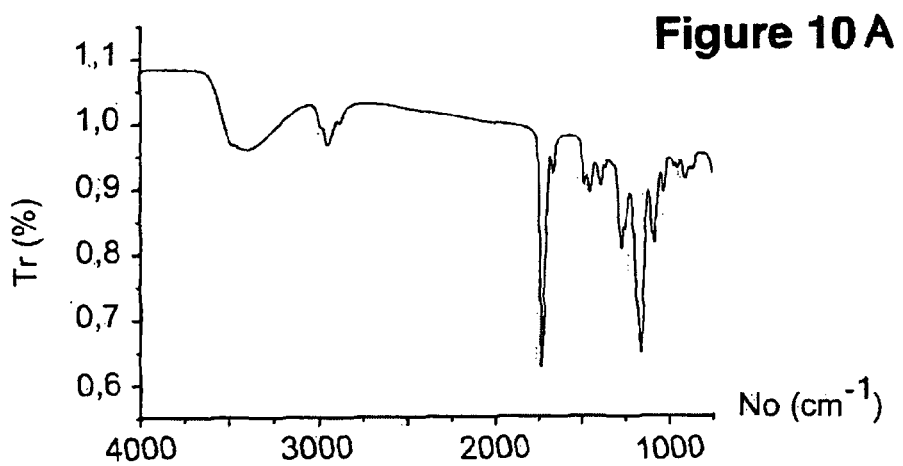
FIGS. 10A, 10B and 10C are infrared spectra (IRRAS) of PHEMA films that illustrate the results of Example 7 below.
Figure 10:
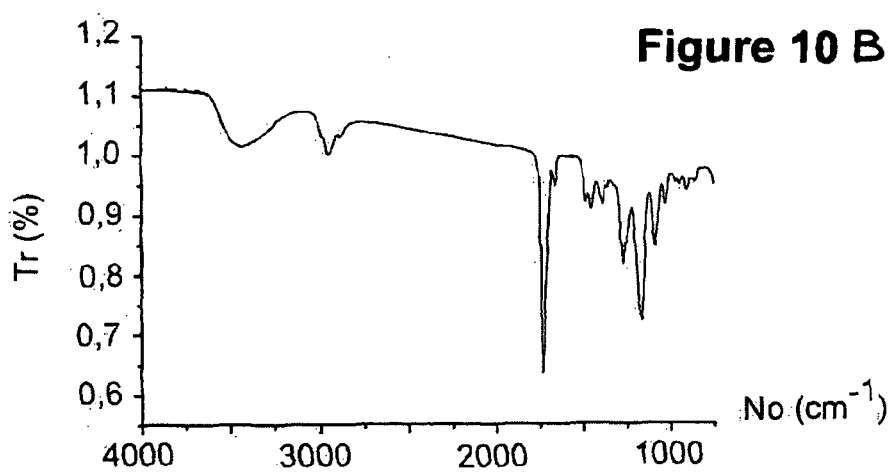
Figure 10:
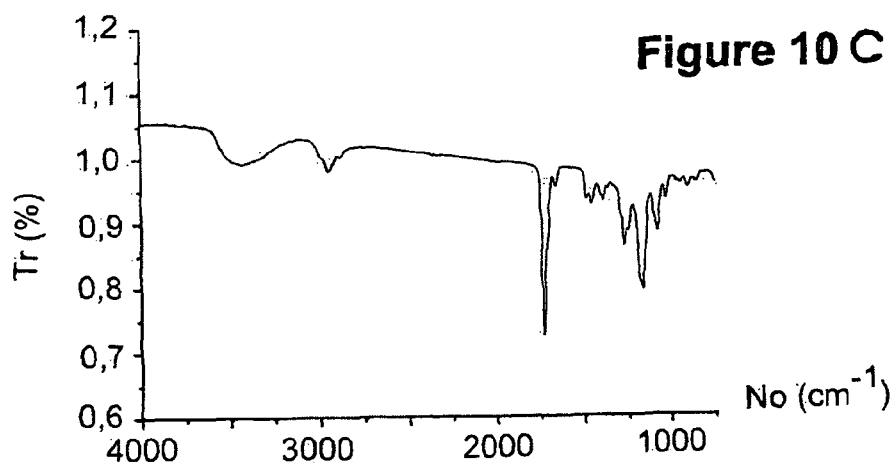

Total disappearance of the PHEMA film is observed in the untreated part, whereas a highly adhesive copper-layered PHEMA film is recovered in the treated part. The IRRAS spectrum in this region reveals that the polymer has exactly the structure of the starting PHEMA film. These results are shown in the attached FIGS. 10A to 10C.

Example 8

Attachment of PAN to a Nickel Surface by Electrochemical Layering with Copper This example illustrates the attachment of polyacrylonitrile (PAN) to gold by layering with copper.

The particular feature of PAN is that it is a particularly hydrophobic polymer, which is neither dissolved in nor swollen by water. The layering in this case is performed in an electrolysis solution containing 10% DMF, which is a solvent for PAN.

The process is performed as in Example 7, by depositing 200 nm of PAN onto a nickel leaf by centrifugation using a solution containing 5% PAN in DMF.

The steps of layering and rinsing are strictly analogous to those of Example 7, except that 10% DMF is added to the electrolytic mixture.

The presence of a PAN film 40 nm thick is observed by IRRAS, which indicates that some of the film has been dissolved, probably during the rinsing step, the layering having been insufficient.

The same experiment performed with a layering solution containing 20% DMF effectively allows a film of about 100 nm to be obtained.

Example 9

Attachment of Silver Chloride to a Gold Surface by Armouring Using a P4VP Film The use of an electrografted P4VP film as armouring for a deposit obtained by precipitation is illustrated herein.

A P4VP film about 30 nm thick is produced on a gold leaf, according to the protocol of Example 1. The leaf thus obtained is dipped into a 5 g/l silver nitrate solution for 30 minutes, rinsed rapidly with deionized water and then dipped for a few minutes with stirring in a 10 g/l sodium chloride solution.

The formation of an adhesive silver chloride deposit that withstands rinsing with water and 2 minutes of rinsing by ultrasound in DMF is observed.

The same operation, performed on a gold leaf not bearing an electrografted P4VP film does not show any deposit after treatment with the NaCl solution.

Example 10

Attachment of Copper to a 316L Stainless-Steel Surface by Armouring Using an Electrografted Poly-∈-Caprolactone Film This example illustrates the possibility of reinforcing a metallic film with an electrografted film whose precursors are cyclic molecules cleavable by nucleophilic or electrophilic attack, in this instance ∈-caprolactone.

A 316L stainless-steel leaf, identical to those of the preceding examples, is dipped into a solution containing 5 mol/l of ∈-caprolactone in DMF, containing 10$^{-2}$ mol/l of 4-nitrophenyldiazonium tetrafluoroborate and 2.5×10$^{-2}$ mol/l of sodium nitrate (NaNO$_3$). This leaf serves as the working electrode in a 3-electrode assembly, and is subjected to 40 voltammetric sweeps at 100 mV/s from its equilibrium potential (−0.147 V/(Ag$^+$/Ag)) to −2.8 V/(Ag$^+$/Ag). After rinsing the leaf with acetone and then with water, formation of a film 100 nm thick showing an intense IR band at 1739 cm$^{-1}$, characteristic of poly-∈-caprolactone, is observed.

The film thus obtained can be used as armouring for the deposition of a layer of copper, according to the same protocols as those described in Examples 1 and 2.

Example 11

Attachment of Copper to an Iron Surface by Armouring Using a Film Obtained from 4-carboxybenzenediazonium tetrafluoroborate This example illustrates the use of diazonium salts bearing complexing groups as precursors of the first material, and also the construction of a metallic film that adheres to the base of the armouring thus constructed.

An iron leaf is dipped into a solution containing $10^{-2}$ mol/l of 4-carboxybenzenediazonium tetrafluoroborate and $5 \times 10^{-3}$ mol/l of TEAP. This leaf serves as the working electrode in a 3-electrode assembly, and is subjected to 5 voltammetric sweeps at 200 mV/s from its equilibrium potential ($\approx +0.3$ V/(Ag$^+$/Ag)) to $-1.5$ V/(Ag$^+$/Ag). After rinsing the leaf with acetone and then with water, the formation of a film about 20 nm thick, which shows intense IR bands at 3235 and 1618 cm$^{-1}$, characteristic of the modification of the surface with carboxyphenyl groups, is observed.

The film thus obtained can be used as armouring for the deposition of a layer of copper, according to the same protocols as those described in Examples 1 and 2.

Specifically, it is observed that a treatment similar to that of Example 2 allows a film of metallic copper that is resistant to an ultrasound treatment for 2 minutes in DMF to be obtained.

Additional Examples

Example 12

This particular example illustrates the complete formation of a seed-layer via an electro-grafted organic layer in which copper precursors are inserted and reduced to deliver a hyperconformal and strongly adherent metallic copper seed-layer, and its use to obtain the electrofilling of trenches in an Damascene type interconnection structure. Without the electro-grafted underlayer, the copper seed-layer is not adherent to the TiN surface.

The substrates are 2×4 cm$^2$ silicon coupons covered with silicon oxide as a dielectric and a 10 nm metallo organic chemical vapor deposition (MOCVD) TiN layer as a barrier to copper diffusion. No specific cleaning nor surface treatment was performed prior to electro-grafting. The experiments are not performed in clean room environment.

An electro-grafted film is obtained from a solution of an ammonium functionalized aryl diazonium tétrafluoroborate in acetonitrile and tetraethylammonium perchlorate (TEAP) as supporting electrolyte.

The electro-grafting is performed at controlled potential in a three electrode system. The TiN surface is used as the working electrode (connected via a crocodile clip), the counter electrode is a graphite surface, and the reference electrode is a silver electrode. They are connected to a EGG modèle 283 potentiostat (Princeton Applied Research).

Like in previous examples, a hyperconformal electro-grafted layer is obtained, with a thickness of ca. 40 nm.

Figure 11:
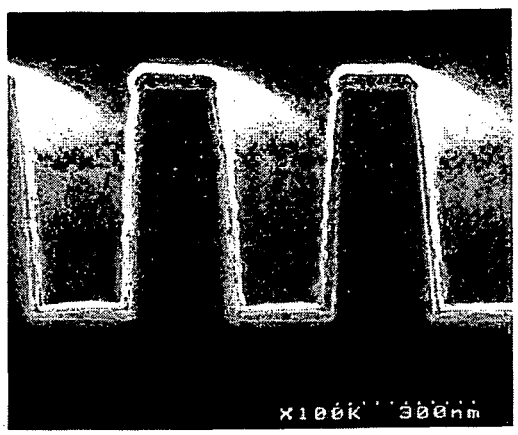
FIG. 11: SEM picture of the side view of a dived coupon showing an estimated 10 nm copper seed-layer obtained from an aryldiazonium electrografted film.

The insertion of metallic precursors is performed in the electro-grafted layer using the following steps: the previously electro-grafted TiN coupons are dipped in a Pd(II) solution. It is observed that the palladium ions are inserted within the films thanks to the complexing amine groups present in the electro-grafted film. The coupons are then treated with DiMethyl Amino Borane (DMAB) to reduce the palladium ions to metallic palladium within the films, and then dipped in a copper electroless solution: a very thin and uniform copper layer is obtained on the whole treated surface, thanks to the catalysis by the palladium clusters present within the electro-grafted film. On the structured TiN substrate, an examination with a high resolution Scanning Electron Microscope (SEM) reveals that the thin copper layer is hyperconformal, just like the parent electro-grafted organic layer, and has a thickness of the order of 10 nm (annexed FIG. 11).

A copper electrodeposition is further performed on this thin seed-layer using a solution of copper sulphate in sulfuric acid, under galvanostatic conditions at 7 mA/cm$^2$. A uniform copper layer is rapidly formed on the coupon previously treated.

Figure 12:
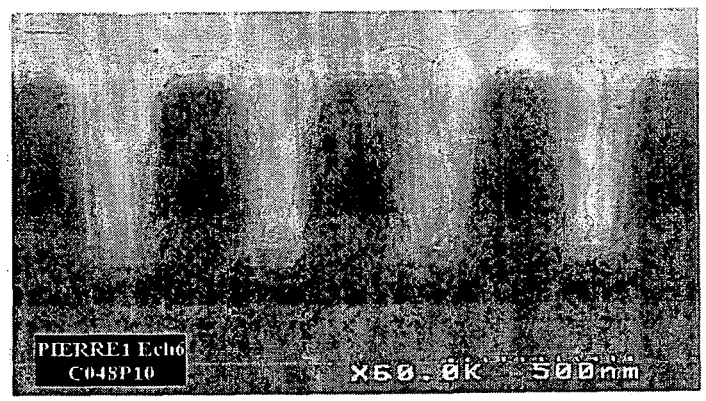
FIG. 12: SEM picture of the side view of a dived coupon showing the filling of 0.22 µm trenches with copper by ECD on a seed-layer obtained via an aryldiazonium electro-grafted film metallized with palladium.

The substrate is further clived and a side picture of the fracture is examined by SEM. A perfect filling of the trenches is detected, with very little voids, showing that the thin copper layer built in the electro-grafted layer played its role of a seed-layer for copper electrodeposition (annexed FIG. 12).

Example 13

This example illustrates the complete formation of a copper seed-layer by electro-grafting from a mixing of vinylic monomers and copper precursors in a single bath, and its use to obtain the electrofilling of trenches in an Damascene type interconnection structure. In the absence of the electro-grafting precursors, the seed-layer does not even form on the TiN surface.

The substrates are 2×4 cm$^2$ silicon coupons covered with silicon oxide as a dielectric and a 10 nm metallo organic chemical vapor deposition (MOCVD) TiN layer as a barrier to copper diffusion. No specific cleaning nor surface treatment was performed prior to electro-grafting. The experiments are not performed in clean room environment.

These substrates are used as working electrodes in a three electrode system similar to the one used in the previous example, to obtain an electro-grafted layer. The electro-grafting bath is a solution of 4-vinyl pyridine and copper bromine in dimethyl formamide, with TEAP as the supporting electrolyte. The coupons are dipped on two third of their height in the electro-grafting bath, and the contact is made with a crocodile clip which does not dip into the solution.

Spectacular results are obtained: a uniform metallization is obtained (thickness measurements performed at the meniscus and 5 cm down are identical at AFM precision), even several centimeters away from the electrode contact.

A complementary experiment is done in which the TiN surface is scratched through horizontally, at about one fifth of its height from the bottom, down to the SiO2 underlayer. The scratched coupon is dipped in the electro-grafting bath, scratch down, so that the scratched region dips into the bath. As previously, the coupon is dipped in the electro-grafted bath over two third of its height and the contact (clip) does not dip into the bath.

Figure 13:
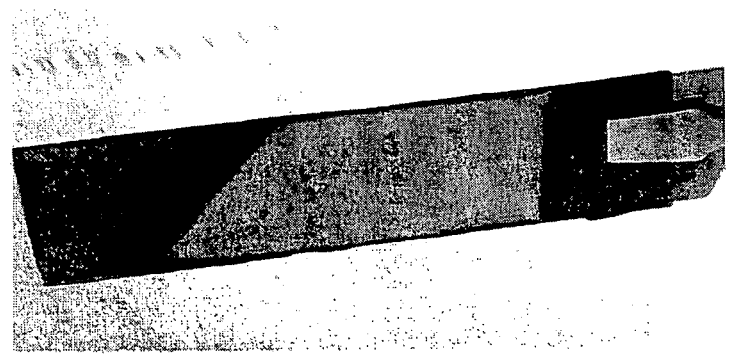
FIG. 13: Macroscopic picture of a blanket coupon with 400 nm SiO2 and a top 10 nm TiN barrier layer, bearing a copper seed-layer obtained by electro-grafting from a solution of 4-VP and copper precursors in DMF. The TiN top layer was scratched through, down to the SiO2, prior to electro-grafting, and no copper deposit is observed on that TiN zone which was dipping into the solution but was not connected.

The electro-grafting is performed under voltammetric conditions, and a uniform copper layer is obtained from the meniscus to the scratch, while there is no deposit on the region going from the scratch to the bottom of the coupon: the region of the TiN surface which was not electrically connected is not coated. This confirms that the growth of the copper layer is indeed electrically activated, and that the deposit is not obtained by some electroless mechanism (annexed FIG. 13).

As observed with the blanket scratch-free coupon, thickness measurements by AFM reveal a good uniformity of the copper layer, and hence a low sensitivity to the resistivity of the initial TiN substrate: even mixed with copper precursors, the growth mechanism has the characteristics of an electro-initiated reaction such as electro-grafting.

In addition, similar attempts without the organic precursors (4-vinyl pyridine) did not allow the production of a direct metallic layer on the TiN barrier, except at the meniscus, a feature which is attributed to the well-known resistivity effect.

It is worth noticing, however, that the currents measured during the electro-grafting are rapidly much higher (of the order of several mA) than those one would expect for a mere electro-grafting reaction. The majority of the current could be attributed to the reduction of copper precursors to metallic copper on the seed-layer which is formed in the very first moments of the polarization. Residual currents due to the electro-grafting are soon probably non detectable when the growth of the copper itself has begun, beyond the seed-layer.

Complementary attempts have finally been performed on structured samples (trenches, width 0.22 µm, spacing 0.22 µm, depth 400 nm), to study the morphological behavior of the copper layers. Similar voltammetric conditions are used, in similar baths and using the same experimental setup. Similar macroscopically uniform copper layers are obtained.

The coupons are dipped over two third of their height, so that the seed-layer is obtained over two third of the coupon, the last third being bare TiN.

SEM observations on the treated zones clearly show a continuous and conformal metallic layer on the barrier. This key result is in line with the high conformity obtained with the electro-grafted films alone.

These seed-layers are used to initiate the electrochemical deposition (ECD) of copper from a commercial bath. Towards this purpose, an electrical contact is clipped on the zone previously electro-grafted. Thus, in the course of the ECD deposit, the coupon is used upside down, so that the zone which has not been previously electro-grafted is dipping into the solution.

Figure 14:
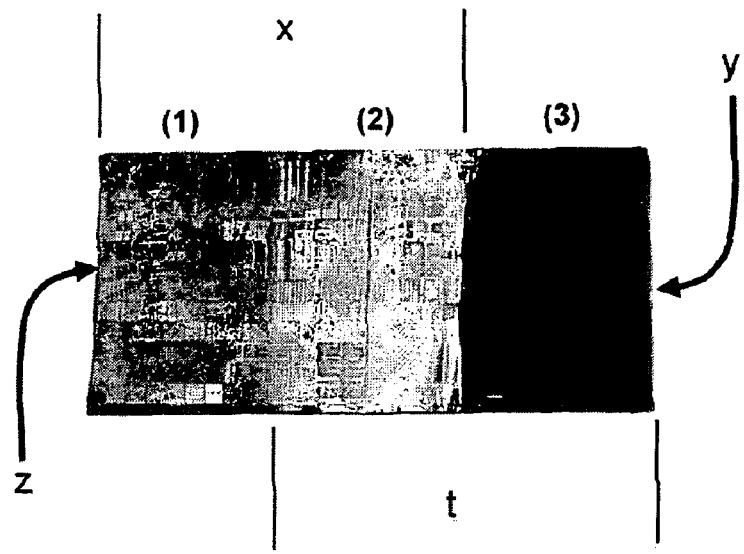
FIG. 14: Picture of a structured coupon bearing a seed-layer obtained by a 4-VP based electro-grafting and treated by ECD: (1) seed-layer only zone; (2) seed-layer+ECD; (3) bare TiN zone.

After ECD, the aspect of the sample is very interesting: a nice uniform copper metallization layer is obtained on the central third of the coupon, i.e. on the surface previously electro-grafted, while no copper deposit is observed on the bare TiN bottom third. Moreover, as previously, the contact had been clipped on the top third of the coupon, and did not dip into the ECD bath and was located at more than 1 cm from the meniscus: the electro-grafted seed-layer had thus been conductive enough to allow the copper ECD deposit on the treated zone dipping into the bath (annexed FIG. 14). On annexed FIG. 14, "x" represents the electrografted area; "y" represents the contact for electrographting; "Z" represents the contact for electroplating; and "t" the electroplated area.

Figure 15:
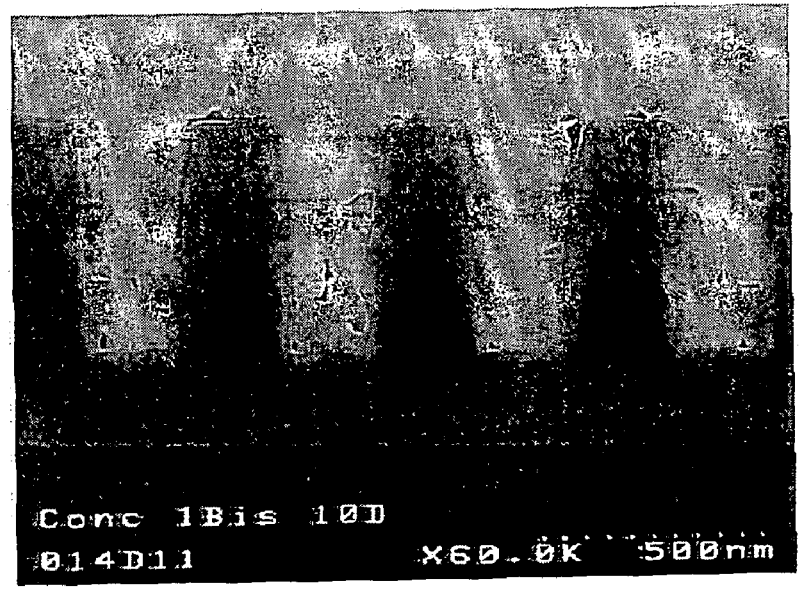
FIG. 15: SEM picture of the side view of a clived coupon showing the filling of 0.22 µm trenches with copper by ECD on a seed-layer obtained via a 4-VP+copper precursor based electro-grafted film.

At the microscopic level, copper filling is examined using SEM on Focused Ion Beam (FIB) cut side views. The filling is satisfactory, eventhough several voids are observed. The inventors think that in more adequate conditions (clean room, better surface control and preparation, etc.), better fillings could be obtained (FIG. 15).

LIST OF REFERENCES

[1] E. P. Plueddmann, "Fundamentals of Adhesion", L. H. Lee (Ed.), p. 279, Plenum Press, New York (1990).
[2] Z. Mekhalif, J. Riga, J.-J Pireaux and J. Delhalle, *Langmuir*, 13, 2285 (1997).
[3] V. Huc, J. P. Bourgoin, C. Bureau, F. Valin, G. Zalczer and S. Palacin, "Self-assembled mono- and multi-layers on gold from phenyl-diisocyanides and ruthenium phthalocyanines", *Journal of Physical Chemistry B*, 103, 10489 (1999).
[4] WO-A-9844172.
[5] EP-A-665 275.
[6] C. Jérôme et al., *Chem. Mater.*, 2001, 13, 1656.
[7] U.S. Pat. No. 4,975,475.
[8] U.S. Pat. No. 6,171,661.

The invention claimed is:

1. A process for coating an electrically conductive or semiconductive surface, comprising:
   applying a solution of at least one monomer and an electrochemically reducible metal ion to a surface portion of the substrate to be coated;
   applying voltammetric sweeps on the coated electrically conductive or semi-conductive surface;
   wherein
   the current applied during the voltammetric sweeps simultaneously:
   a) electrografts a portion of the at least one monomer to the electrically conductive surface and a polymer chain is formed beginning with the electrografted monomers, and
   b) reduces the metal ion to metal;
   to obtain a coating comprising an electrografted polymer and a uniform distribution of metal.

2. The process according to claim 1, wherein the electrically conductive or semiconductive surface is mineral or organic.

3. The process according to claim 1, wherein the at least one monomer is at least one activated vinyl monomer of structure (I):

wherein
$R^1$, $R^2$, $R^3$ and $R^4$ are organic groups selected, independently of each other, from the group consisting of the following organic functions: hydrogen, hydroxyl, amine, thiol, carboxylic acid, ester, amide, imide, imidoester, acid halide, acid anhydride, nitrile, succinimide, phthalimide, isocyanate, epoxide, siloxane, benzoquinone, benzophenone, carbonyldiimidazole, para-toluenesulphonyl, para-nitrophenyl chloroformate, ethylenic, vinyl and aromatic.

4. The process according to claim 3, wherein at least one from among $R^1$, $R^2$, $R^3$ and $R^4$ comprises a cation complexing functional group.

5. The process according to claim 1, wherein the at least one monomer is selected from the group of vinyl monomers consisting of acrylonitrile, methacrylonitrile, methyl methacrylate, ethyl methacrylate, butyl methacrylate, propyl methacrylate, hydroxyethyl methacrylate, hydroxypropyl methacrylate, glycidyl methacrylate, aminoethyl, aminopropyl, aminobutyl, aminopentyl and aminohexyl methacrylamides, cyanoacrylates, polyethylene glycol dimethacrylate, acrylic acid, methacrylic acid, styrene, para-chlorostyrene, N-vinylpyrrolidone, 4-vinylpyridine, vinyl halides, acryloyl chloride and methacryloyl chloride, and derivatives thereof.

6. The process according to claim 1, wherein the metal ion is an ion of a metal selected from the group of metals consisting of copper, zinc, gold, tin, titanium, vanadium, chromium, iron, cobalt, lithium, sodium, aluminum, magnesium, potassium, rubidium, caesium, strontium, yttrium, niobium, molybdenum, ruthenium, rhodium, palladium, silver, cadmium, indium, lutetium, hafnium, tantalum, tungsten, rhenium, osmium, iridium, platinum, mercury, thallium, lead, bismuth, a lanthanide metal and an actinide metal.

7. The process according to claim 1, wherein the coated surface provides an interface reinforcement between a conductive or semiconductive substrate and a metal.

8. A process for the manufacture of an interconnection component in microelectronics comprising the process according to claim 1.

9. A process for anticorrosion treatment of a metallic surface comprising the process according to claim 1.

10. A process for surface treatment of an object for implanting into a living organism comprising the process according to claim 1.

11. A process for the manufacture of a biochip comprising the process according to claim 1.

12. A process for the manufacture of a surface with catalytic properties comprising the process according to claim 1.

* * * * *